(12) United States Patent
McDonald

(10) Patent No.: US 7,830,040 B2
(45) Date of Patent: Nov. 9, 2010

(54) COILED TRANSMISSION LINE PULSE GENERATORS

(75) Inventor: Kenneth Fox McDonald, Columbia, MO (US)

(73) Assignee: Sci-Eng Solutions, LLC, Columbia, MO (US)

( * ) Notice: Subject to any disclaimer, the term of this patent is extended or adjusted under 35 U.S.C. 154(b) by 459 days.

(21) Appl. No.: 11/749,043

(22) Filed: May 15, 2007

(65) Prior Publication Data

US 2008/0284276 A1    Nov. 20, 2008

(51) Int. Cl.
*H03K 3/02* (2006.01)
(52) U.S. Cl. .................................................... 307/106
(58) Field of Classification Search ................ 307/106, 307/147; 333/17.3, 124, 134
See application file for complete search history.

(56) References Cited

U.S. PATENT DOCUMENTS

| | | | | |
|---|---|---|---|---|
| 4,583,589 A | * | 4/1986 | Kasevich | 166/60 |
| 5,675,260 A | * | 10/1997 | Consiglio | 324/763 |
| 5,793,477 A | * | 8/1998 | Laakmann | 356/28 |
| 6,167,065 A | * | 12/2000 | Rocca | 372/5 |
| 7,372,427 B2 | * | 5/2008 | Leisten | 343/895 |
| 7,440,253 B2 | * | 10/2008 | Kauffman | 361/119 |

* cited by examiner

*Primary Examiner*—Albert W Paladini

(57) ABSTRACT

Methods and apparatus are provided for fabricating and constructing solid dielectric "Coiled Transmission Line" pulse generators in radial or axial coiled geometries. The pour and cure fabrication process enables a wide variety of geometries and form factors. The volume between the conductors is filled with liquid blends of monomers, polymers, oligomers, and/or cross-linkers and dielectric powders; and then cured to form high field strength and high dielectric constant solid dielectric transmission lines that intrinsically produce ideal rectangular high voltage pulses when charged and switched into matched impedance loads. Voltage levels may be increased by Marx and/or Blumlein principles incorporating spark gap or, preferentially, solid state switches (such as optically triggered thyristors) which produce reliable, high repetition rate operation. Moreover, these Marxed pulse generators can be DC charged and do not require additional pulse forming circuitry, pulse forming lines, transformers, or an a high voltage spark gap output switch. The apparatus accommodates a wide range of voltages, impedances, pulse durations, pulse repetition rates, and duty cycles. The resulting mobile or flight platform friendly cylindrical geometric configuration is much more compact, light-weight, and robust than conventional linear geometries, or pulse generators constructed from conventional components. Installing additional circuitry may accommodate optional pulse shape improvements. The Coiled Transmission Lines can also be connected in parallel to decrease the impedance, or in series to increase the pulse length.

20 Claims, 28 Drawing Sheets

COILED TRANSMISSION LINE PULSE GENERATORS

GOVERNMENT RIGHTS

The U.S. Government has a paid-up license in this invention and the right, in limited circumstances, to require the patent owner to license others on reasonable terms as provided for by the terms of United States Department of Energy under Contract No. DE-FG02-04ER84064.

DESCRIPTION

1. Field of the Invention (Technical Field)

The present invention relates to electro-mechanical components and electrical apparatus that are designed to generate nearly rectangular, high voltage pulses, which are often used to provide pulse power for physical apparatus such as high power microwave sources, lasers, particle beam generators, X-Ray generators, linear accelerators, etc. Although they may operate in a single shot mode, such pulse generators (frequently referred to as modulators) typically produce a pulse train that has specific voltage amplitude, current amplitude, pulse shape, pulse fidelity, pulse duration, pulse repetition rate, and duty cycle. For example, a pulse generator designed to drive a high power relativistic magnetron may produce a series of 500,000 volt, 200 ns long flat-top pulses at a continuous pulse repetition rate of 10 pulses per second.

Furthermore, charged transmission lines (such as coaxial cables) intrinsically generate nearly square voltage pulses when switched into load resistors that match the impedance of the transmission line. High electric field strength enables high voltage operation and thus yields increased energy density; and high dielectric constants are advantageous because the line length required to generate a specific pulse duration is reduced. The geometric shape of the transmission line is important to minimize electric field stress; and the form factor is improved by coiling the lines radially or axially. Hence, improved transmission line pulse generator designs require high dielectric constant, high field strength media that can be precisely cast into electrical conductor topologies that are commensurate with compact designs and geometric architectures.

2. Background Art

Note that the following discussion is given for more complete background of the scientific principles and is not to be construed as an admission that such concepts are prior art for patentability determination purposes.

Many physical apparatus such as particle beam accelerators, lasers, high power microwave systems, etc.; require nearly rectangular (flat-topped) high voltage electrical pulses. These requirements are currently met with different circuit topologies selected according to the desired pulse shape parameters and repetition rate specifications. The two most common existing techniques are Marx generators charged liquid dielectric pulse forming lines: where short duration, flat-topped pulses are required for single pulse applications; and pulse forming networks in conjunction with hydrogen thyratron (or other) switches and pulse transformers for the generation of long duration, flat-topped pulses.

When relatively short flat-topped pulses are required, Marx generators are frequently used to charge pulse forming lines (typically de-ionized water filled co-axial cylinders), which are then switched into nearly matched impedance resistive loads to generate rectangular pulses on the order of one hundred nanoseconds duration. However, a water pulse forming line would have to be over fifty feet long to produce a one microsecond pulse, making it unpractical for the long pulse parameter space. Moreover, systems using Marx generators and pulse forming lines also require a high voltage output switch between the pulse forming line and the load. For example, when a ten stage Marx generator that is charged to 100 kV per stage is erected, it can charge a de-ionized water dielectric transmission line to approximately one million volts. This transmission line will then generate a 500 kV pulse when the output switch discharges the transmission line into a matched load resistor. Accordingly, a 1 MV output switch is required to hold off the transmission line voltage until it has been fully charged (i.e., the Marx is fully discharged, thereby transferring its stored energy into the transmission line.) Since no existing 1 MV high voltage output switch can operate reliably at high repetition rates or for long life cycles, this topology is not practical for repetition rated devices. Finally, because of their intrinsic high conductivity; high dielectric constant, liquid transmission line pulse generators must be equipped with de-ionization apparatus and must be pulse charged, thereby limiting their practicality.

Marx generators have also been built by replacing the capacitors with pulse forming networks to simultaneously multiply the voltage and generate nearly rectangular pulses. Such Marxed-PFN's (High Energy Density Pulsers) were fabricated by the Air Force Weapons Laboratory in Albuquerque, N. Mex. in the 1960's. Twenty, Five-section, 25 kV ceramic capacitor pulse forming networks were Marxed together with spark gaps to create single shot 250 kV, 70 ns flat-topped pulses into a 70 Ohm load. However, such devices require very high parts counts and can be large and heavy.

Systems that require high voltage, long duration flat-topped pulses operated at high repetition rates have also been satisfied by using circuits that incorporate Pulse Forming Networks with hydrogen thyratron switches and transformers to produce shaped pulses at high voltages. However the self-inductance of these transformers typically prohibits fast rise-times, and the energy lost in the rise and fall portions of the pulse lead to inefficiencies. Moreover they are inherently large and heavy.

There is a need for compact, robust, pulse generators that are capable of generating nearly rectangular high voltage electrical pulses while operating at high repetition rates. Typical rise-times for these generators range from about one nanosecond to several hundred nanoseconds; while typical pulse durations range from less than 10 nanoseconds to as long as a few microseconds.

The best example of prior art is the patent by Rocca (U.S. Pat. No. 6,167,065), which discloses the use of a Marx generator charged, high voltage, liquid dielectric Blumlein that is discharged through a high voltage (~1 MV) gas insulated spark gap output switch into the laser to generate a plasma within a capillary structure. There are at least xx major differences between Rocca and the apparatus described herein: (1) Rocca uses liquid dielectric insulated transmission lines to shape the pulse into a temporally rectangular profile, whereas this disclosure employs solid dielectric transmission lines; (2) Rocca requires a Marx generator to multiply the Marx stage voltage and pulse charge the Blumlein(s) to high voltages (~1-2 MV), whereas the solid dielectric transmission lines described in this disclosure does not require a charging Marx generator, but can be charged directly by a conventional DC power supply; (3) Rocca's liquid dielectric Blumlein(s) require a high voltage (megavolt class) spark gap output switch to discharge the Blumlein(s) into the load, whereas the apparatus disclosed herein intrinsically shapes the pulse via the DC charged transmission lines, which are then connected in a Marx circuit to multiply the voltage on the load, thereby eliminating the requirement for a high voltage output switch; (4) Rocca requires a de-ionization system to reduce the intrinsic conductivity of the liquid dielectric, whereas there is no liquid contained in this disclosure and, therefore, no de-ionization system is necessary; and (5) Rocca requires a high pressure gas handling system to insulate the high voltage gas spark gap output switch, whereas the apparatus described herein does not use an output switch and has no need for this gas handling system. Hence, there are substantial variances between Rocca and the device disclosed herein, with the Rocca system being much more complex and requires many more large apparatus to function.

Other patents are remotely related to the disclosure herein in that they use transmission lines to transport the stored and shaped energy from the source to the load. Among these are Kasevich (U.S. Pat. No. 4,583,589), Leisten (U.S. Pat. No. 7,342,427), Laakmann (U.S. Pat. No. 5,793,477), and Kauffman (U.S. Pat. No. 7,440,253).

Kasevich discloses an RF generator that uses a dielectric gas filled transmission line to transfer energy from an RF source to a dipole antenna load. i.e., "Radio frequency power is supplied from the surface through a transmission line to the radiator dipoles . . . " Kasevich is distinctly different from the apparatus described herein in that Kasevich uses a gas dielectric transmission line, his apparatus stores and shapes the RF energy in a circuit external to the transmission line, and the transmission line is solely for the purpose of transporting the energy from the RF energy store/shaping circuit to the dipole radiator load. Whereas, the transmission line(s) described herein intrinsically stores, shapes, and delivers the energy to the load. There is clearly no anticipation of the apparatus described herein by Kasevich.

Leisten discloses a dielectrically-loaded antenna that improves the bandwidth. The use of a transmission line(s) is solely for the purpose of transporting energy from the source to the load. These transmission lines do not store or shape the energy. Moreover, multiple transmission lines of different lengths are required to achieve the goals manifest the Leisten disclosure. There is clearly no anticipation of McDonald by Leisten: transmission lines are the only commonality and the design and purpose of the transmission lines are distinctly different in the two patents.

Finally, Laakmann and Kauffman use transmission lines solely for the purpose of transporting energy from the source to the load. These transmission lines do not store or shape the energy as described herein. The disclosure contained herein could not have been anticipated by either Kasevich or Leisten: (a) they both use transmission lines solely for the purpose of transporting energy from the source to the load, (b) neither uses transmission lines to store or shape the energy, (c) neither uses castable ceramic transmission lines, and (d) neither employs transmission lines fabricated into compact, robust form factors.

SUMMARY OF THE INVENTION

Disclosure of the Invention

It is an object of this invention to provide improved pulse generators that intrinsically produce nearly rectangular, high voltage pulses without the use of additional pulse charging or pulse forming circuit elements, or pulse forming lines.

It is a further object of this invention to provide electrical circuit architectures such as Marx or Blumlein principles to increase the system output voltage without either increasing the charge voltage or the use of either transformers, pulse charging techniques, or high voltage output switches and their attendant ancillary systems.

It is a further object of this invention to provide compact, lightweight, high voltage pulse generators with improved geometries and form factors, particularly with respect to meeting the requirements for robust mobile or flight applications.

It is further object of this invention to provide high voltage pulse generators that operate at high repetition rates.

It is a further object of this invention to provide high voltage pulse generators with either spark gap or solid state switches; including photoconductive and optically triggered switches and their attendant photon generation and delivery mechanisms.

It is a further object of this invention to provide high voltage pulse generators with versatile pulse shaping capabilities.

To Achieve the Foregoing Objects:

Fabrication methods, techniques, and procedures will be provided to form, cast, machine or otherwise make solid dielectric transmission lines configured in coiled geometries such as radial spirals or axial spools; or as linear devices for some short pulse applications. At a minimum, transmission line conductor (electrode) shapes (geometries) include Parallel Plate, Tri-plate; Circle in Box; and Co-axial cross-sectional forms.

A dielectric material system will be provided that typically (but not necessarily) consists of a formulation of nano-crystalline ceramic dielectric powders blended into liquid dielectric monomers, polymers, oligomers, and/or cross-linkers that, in liquid form, can partially or completely fill the volume between transmission line electrodes and then be cured to form a solid media with high field strength and high dielectric constant. When cured, these media may be either flexible, e.g., plastic, or rigid, e.g., solid. One or more pour and cure cycles may be used to complete the device. Partial cures may be used between pours.

Examples of methods, techniques, and procedures are provided to fabricate compact Coiled Transmission Line pulse generators. Among these are methods to alleviate thermal and shrinkage induced mechanical stresses on the solid dielectric media.

Methods of reducing the electric field potential at the terminations of the transmission lines and on the joints of the outer conductor are incorporated into the design.

Voltage multiplication circuit topologies are provided to increase the output voltage without transformers.

Charging and switching architectures are provided to increase the pulse repetition rate capability and reliability of the system: including the possible use of spark gaps or solid state switches including electrically triggered devices such as Thyristors, MOSFETs or IGBT's; Photoconductive Solid-State Switches such as Silicon Carbide; or Photo-Initiated Solid-State Switches such as Optical Thyristors.

Additional electrical elements, such as inductors, capacitors, resistors, and switches may be added to various parts of the circuit to enhance the pulse shape for dynamic, non-linear loads; or to protect the circuit against fault modes such as short-circuits.

Finally, mounting schemes, environmental enclosures, electrically insulating media, high voltage feed-throughs and electrical connections, and ancillary support systems may be added to various parts of the apparatus.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a particular embodiment of the invention and are not to be construed as limiting the invention. In the drawings.

DETAILED DESCRIPTION OF THE PREFERRED EMBODIMENTS

Best Modes for Carrying Out the Invention

The embodiment of the present invention is best described in three stages: the circuit architecture, the geometric form, and the fabrication process. The circuit architecture and the geometric form are discussed first.

Figure 1:
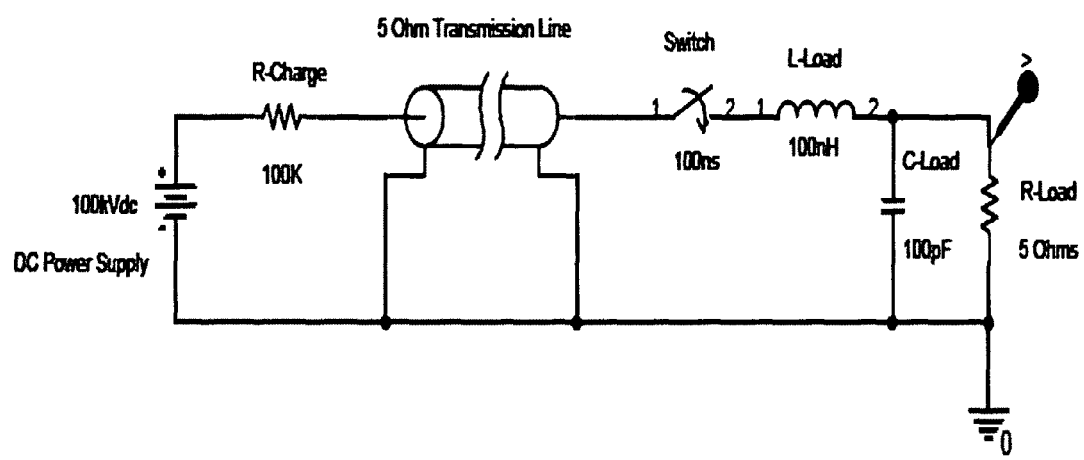
FIG. 1 is a simplified circuit diagram of a coaxial transmission line pulse generator; consisting of a power supply to charge the transmission line, a solid dielectric transmission line that (when charged) stores the energy and intrinsically forms the pulse into a trapezoidal (nearly rectangular) temporal shape, a switch that holds off the voltage on the transmission line while it is charging (typically DC) and transfers the stored energy out of the transmission line after the charge cycle is complete, a matching impedance load resistor, and the ancillary circuits and components required to operate and trigger the switch.

The circuit diagram for a single coaxial transmission line pulse generator shown in FIG. 1 exemplifies one embodiment of the present invention. This pulse generator consists of a power supply to charge the transmission line, a solid dielectric transmission line that (when charged) stores the energy and intrinsically forms the pulse into a trapezoidal (nearly rectangular) temporal shape, a switch that holds off the voltage on the transmission line while it is charging (typically DC) and transfers the stored energy out of the transmission line after the charge cycle is complete, a matching impedance load resistor, and the ancillary circuits and components required to operate and trigger the switch.

Figure 2:
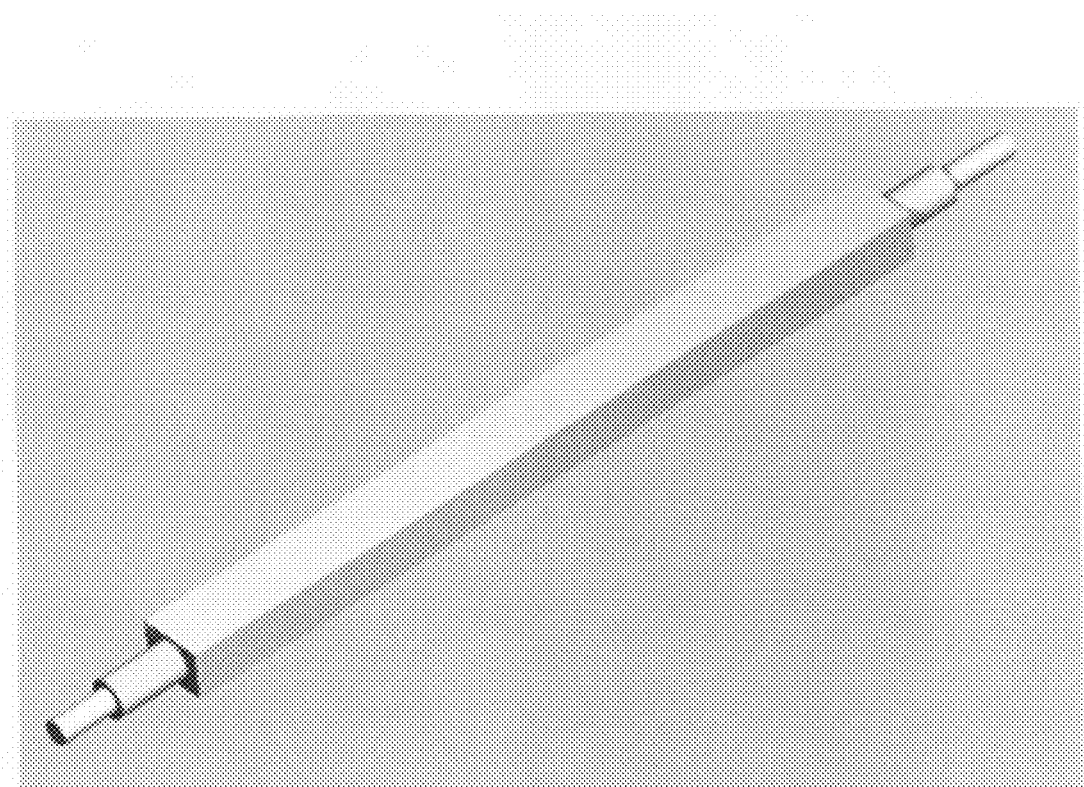
FIG. 2 depicts a solid dielectric linear coaxial transmission line; constructed with a solid dielectric nano-crystalline ceramic/polymer blend that is poured and thermally cured in two layers. The transmission line becomes the key component for a pulse generator when a high voltage charge mechanism, switch, and matching impedance load resistor are added to the circuit as shown in FIG. 1.

An embodiment demonstrating one geometric form of the present invention is depicted in FIG. 2; which illustrates a linear solid dielectric coaxial transmission line. For example, the dielectric media could be a nano-ceramic/epoxy formulation that is thermally cured. When coupled with the requisite power supply, switch, and load resistor, this pulse generator topology would be useful for generating up to approximately 50 kV pulses into a matched impedance load. Pulse durations could be shorter than 20 ns and as long as 100 ns. Typical uses could be for radars, RF sources, or calibration pulsers. Limitations on the linear device include the length, e.g., for a relative dielectric constant of fifty, a 50 ns flat-topped pulse duration would require a length of about four feet. The impedance would typically range from 2 to 50 Ohms. The devices could be configured in series or parallel to increase the pulse length or decrease the impedance, accordingly. The pulse generator could be either DC or pulse charged and the switches could be gas spark gaps or solid-state devices such as IGBT's, MOSFET's, or optically triggered thyristors. Moreover, multiple devices could be connected in Marx generator and or Blumlein circuit configurations to increase the voltage capability.

Figure 3:
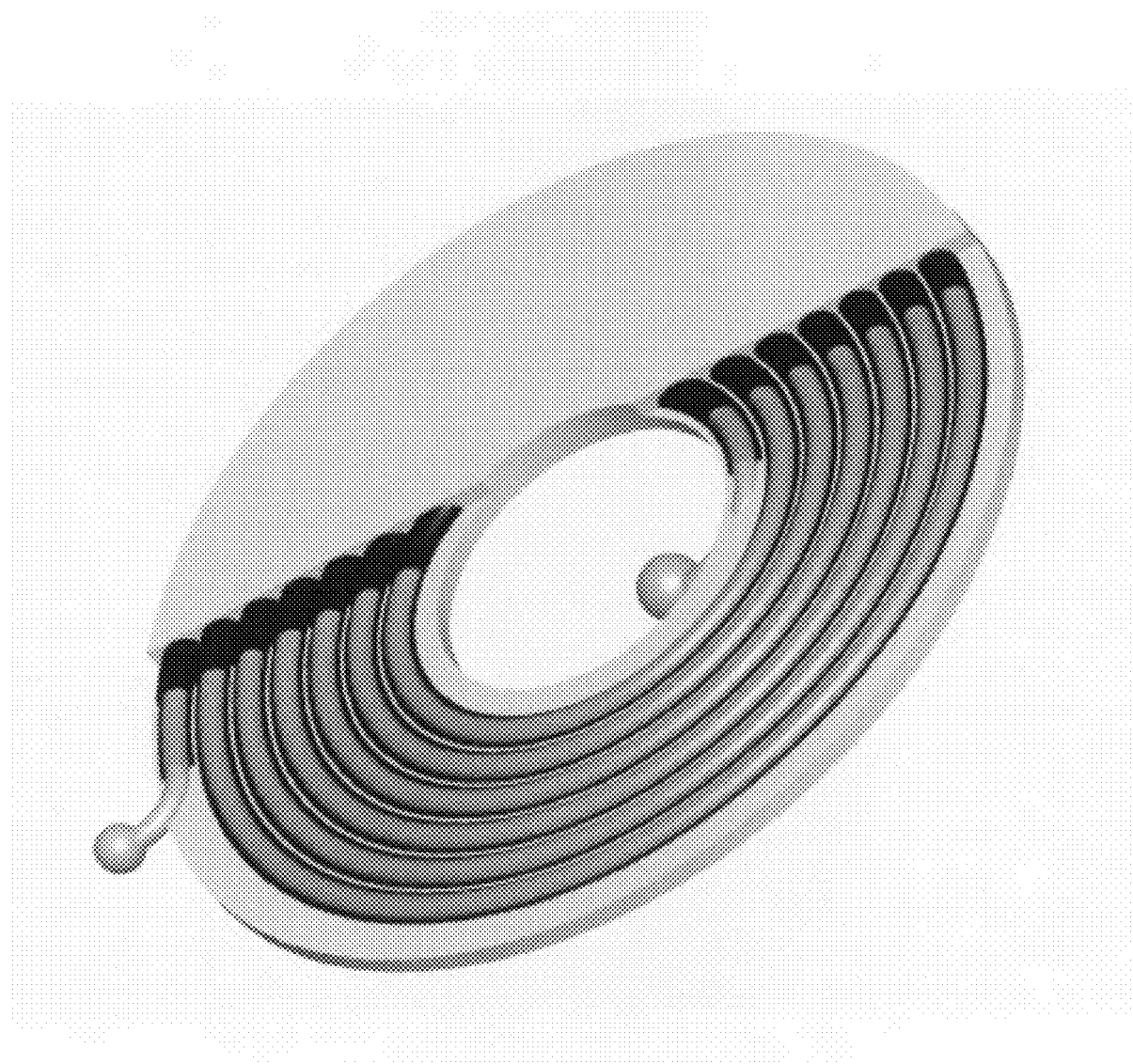
FIG. 3 depicts a cross-sectional view of a coaxial, nano-ceramic/polymer Coiled Transmission Line configured in a radial spiral, which also becomes the key component for a pulse generator when a high voltage charge mechanism, switch, and matching impedance load resistor are added to the circuit as shown in FIG. 1.

An improved embodiment of the present invention is depicted in FIG. 3; which shows a coaxial nano-ceramic/polymer transmission line configured into a radial spiral form. The figure shows a cross-sectional view for clarity, whereas the actual device will have the remainder of the top half of the outer conductor installed, and the remainder of the castable dielectric media injected and cured to complete the coax. The two terminal ends of the inner conductor exit the outer conductor to enable connections to output switches and charge/protection circuitry. When coupled with the requisite power supply, switch, and load resistor, the resulting radial spiral pulse generator could be used for similar applications to that of the linear device, but would have a much improved form factor for some applications. For example, a 200 ns, 50 kV coiled transmission line pulse generator would occupy a disk (short cylindrical) volume of about 30 cm diameter by 1.5 cm thick; yielding a high energy density, robust, compact pulse generator that can address long pulse applications in addition to the short pulse applications pursuant to the linear device. This configuration is much more compact and robust than a linear device as described previously according to FIG. 2. Pulse lengths of at least a few microseconds or more are feasible.

Figure 4:
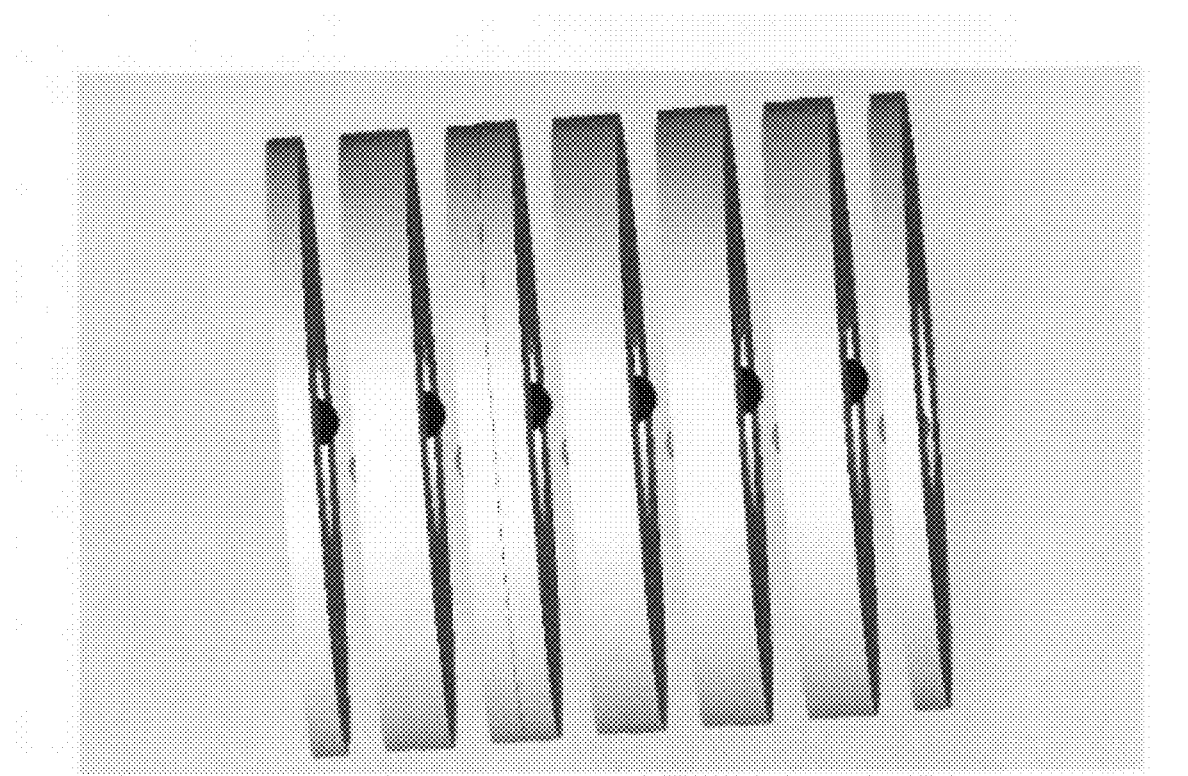
FIG. 4 depicts a side view of twelve Coiled Transmission Lines configured in a spark gap switched Marxed Generator architecture. The ancillary charge/isolation circuit and load, requisite to a pulse generator system are not shown. No high voltage output switch is required.
Figure 5:
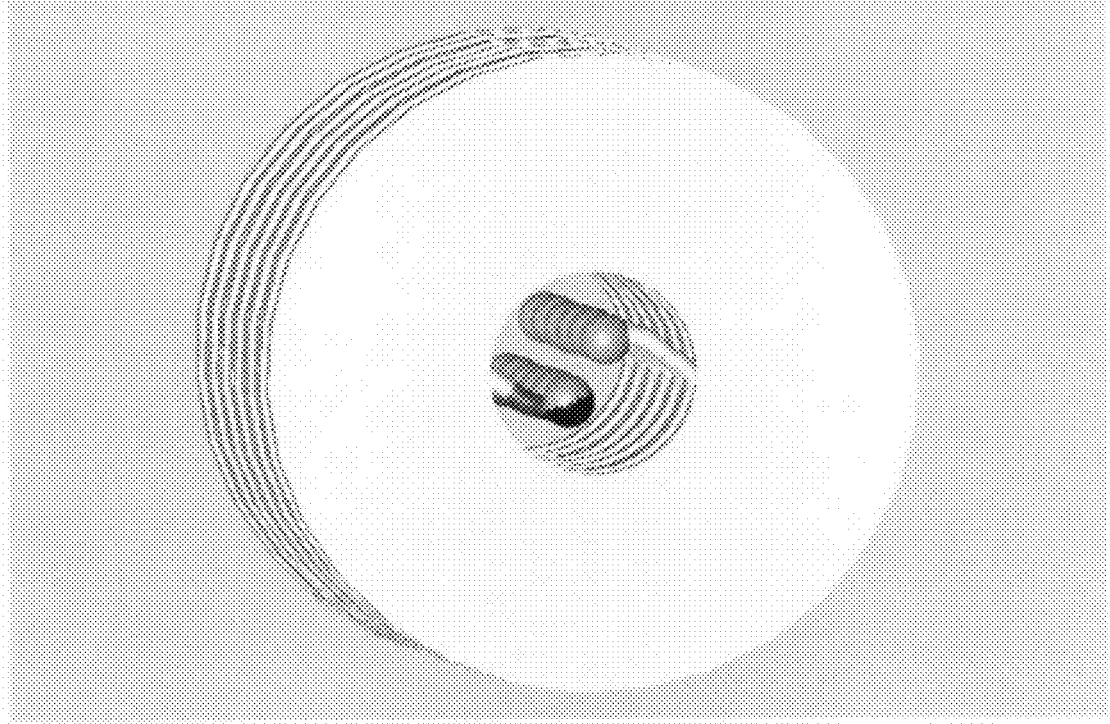
FIG. 5 depicts an end view of the twelve Marxed-Coiled Transmission Lines shown in FIG. 4. The ancillary charge/isolation circuit and load, requisite to a pulse generator system are not shown.

FIG. 4 depicts the side view of twelve coiled transmission lines configured in a Marx topology, while FIG. 5 shows the end view for the same. Charging, switching, Marx voltage multiplication, Blumlein, or Marxed-Blumlein configurations, etc. are similar or identical to that of the linear device. These two figures show a spark gap switched system, but solid state devices could be substituted to achieve reliable, long life, high repetition rate operation.

Figure 6:
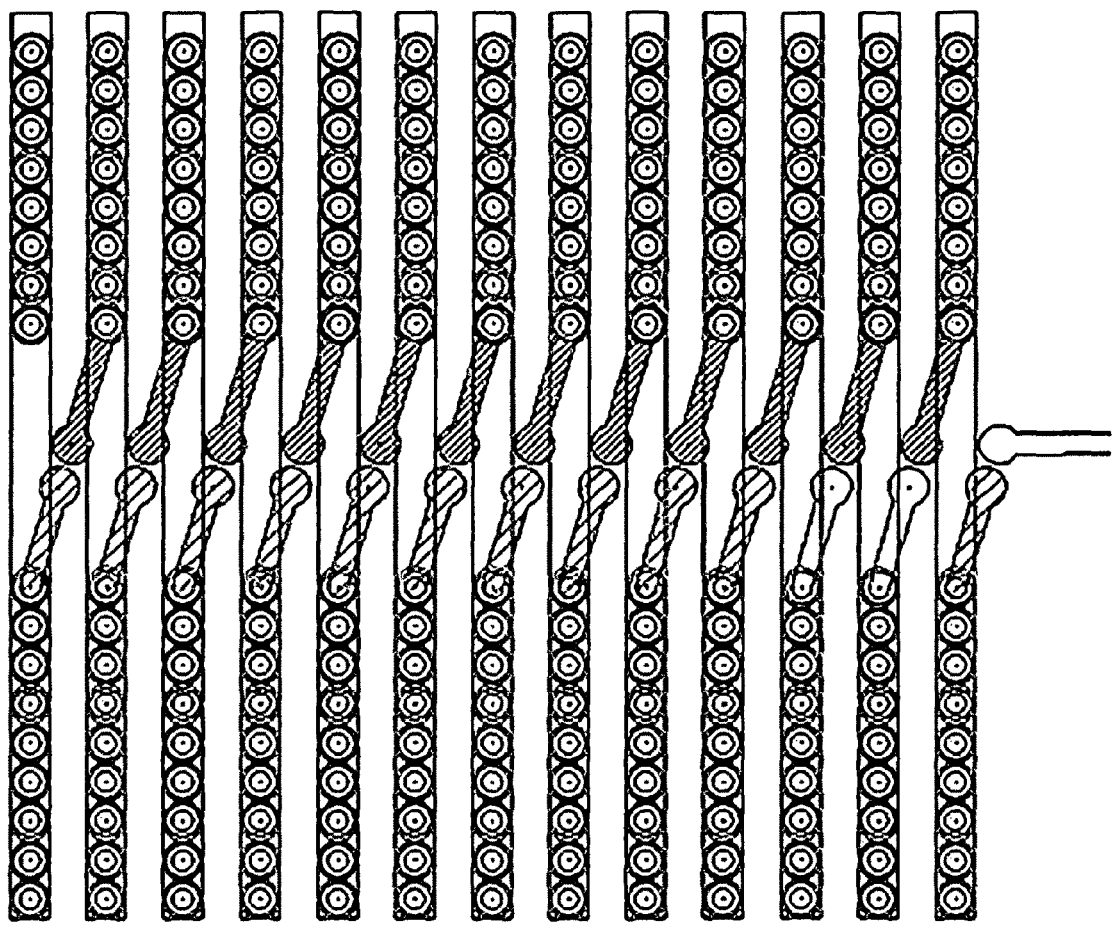
FIG. 6 Depicts a cross-sectional view of thirteen, co-axial, Coiled Transmission Lines configured in a spark gap switched Marx Generator architecture. The ancillary charge/isolation circuit and load, requisite to a pulse generator system are not shown.
Figure 7:
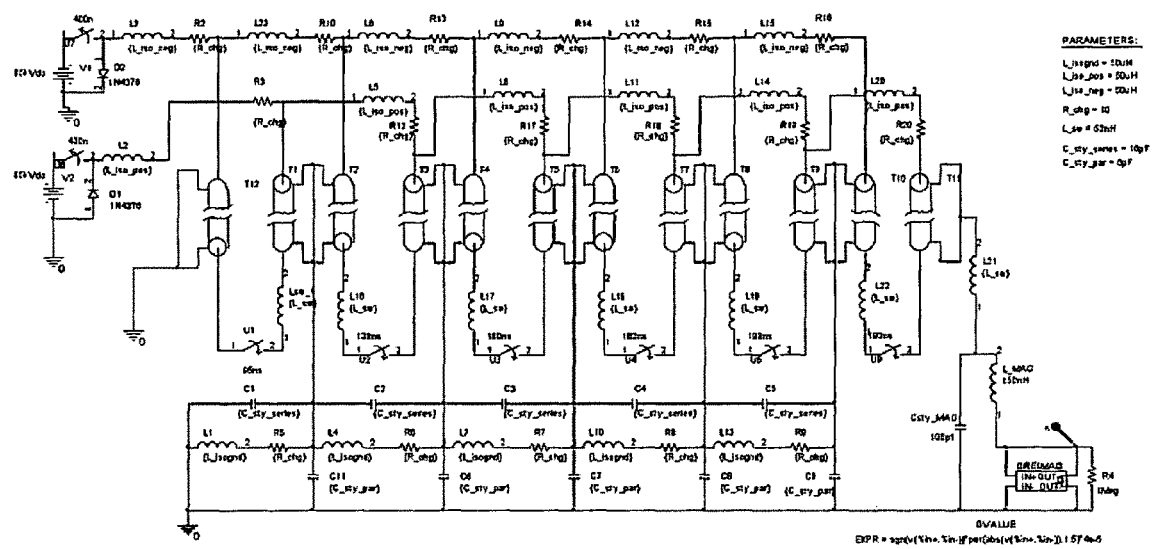
FIG. 7 is a simplified circuit diagram of twelve Marxed-Coiled Transmission Lines with a bi-polar charge scheme. The ancillary charge/isolation circuit and load, requisite to forming a complete pulse generator system are shown in this circuit.
Figure 8:
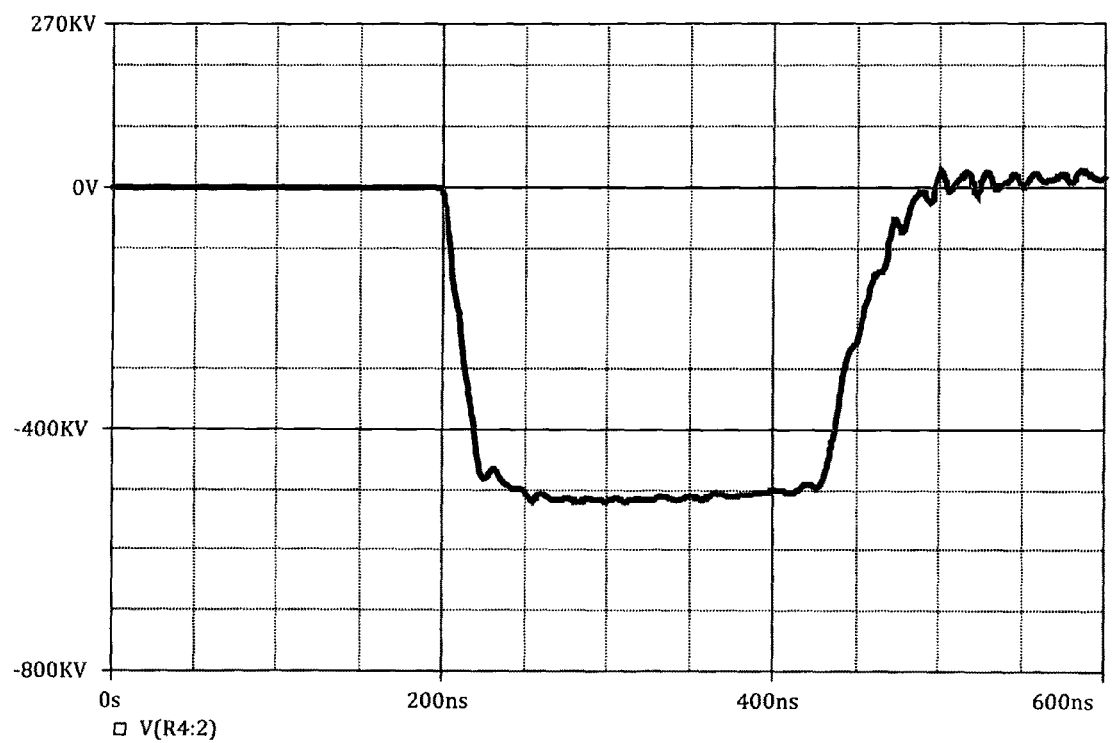
FIG. 8 is a computer (SPICE) Model output voltage waveform for the twelve-stage Marxed-Coiled Transmission Line pulse generator shown in FIG. 7.

A different perspective of the present invention is depicted in FIG. 6, which shows a cut-away side view of thirteen Coiled Transmission Lines configured in a spark gap switched Marxed Generator Architecture. The charge/isolation system is not shown. A simplified circuit diagram for a twelve-stage Marxed Coiled Transmission Line bi-polar charge configuration is shown in FIG. 7, whereas the output voltage pulse for this model is shown in FIG. 8. The charge/isolation system, Marx switches, and load model are shown in this schematic. This "Direct Drive" architecture enables the generation of high voltage, nearly rectangular, flat-topped pulses without the requirement for pulse charging or a high voltage output switch. When the Marx is erected, the system voltage is the multiple of the charge voltage times the number of Marx stages, and the system impedance is the equivalent of the Coiled Transmission Line impedance multiplied by the number of Marx stages. The voltage impressed onto a matched load is one-half of the open circuit voltage. Alternate configurations include Marxed Blumlein's or parallel Coiled Transmission Lines to maximize the load voltage or reduce the system impedance, respectively. The inventive device can contain an arbitrary number of Marx Stages.

Operation of the inventive device has two phases: a charge phase and a discharge phase. The charge phase proceeds as follows: While all of the Marx switches are in the open circuit condition; a power supply (or power supplies) charges the Coiled Transmission Lines via charge-isolation elements (located on both the positive and negative legs of the CTL's) to the pre-determined voltage, and holds the specified voltage at high precision until the discharge cycle is initiated to create pulses at the desired repetition rate. The power supply (or supplies) charge the energy storage elements in parallel through the charge/isolation elements, which can be passive elements such as resistors or inductors, or active elements, including diodes or either electrically or optically triggered semiconductor switches, or photoconductive switches. The type of charge/isolation element is not important for single shot Marx generators, but for repetition rated systems, the energy dissipation during the charge and discharge cycles can result in low system efficacy. Hence, resistors are typically not a good choice for repetition rate systems. While inductors can be low loss devices during the charge cycle, inductance values sufficient to prevent recirculation losses during the discharge cycle can be difficult to obtain and may require magnetic materials. Moreover these elements can represent an undesirable inductive load for switching power supplies. This effect can be mitigated, however by using bifilar windings, which minimize the inductance seen by the power supply, but maintain high recirculation inductance during the discharge cycle.

After the charge cycle is complete, the discharge cycle (Marx "erection") is initiated by triggering the switches. The switches can be triggered either simultaneously or in sequence. Following commencement of switch conduction, the electrostatic energy stored in the Coiled Transmission Lines that were charged in parallel to the power supply voltage ($V_0$), are connected in series by the switches, thereby multiplying the voltage to $N*(V_0/2)$ at a matched impedance load element, where N is the number of Marx stages. The maximum efficiency and best pulse shape are obtained when the load element is predominately resistive and is equal to N times the characteristic impedance of the Coiled Transmission Lines. When this condition is met, the voltage across the resistive load is a single rectangular shape with a voltage equal to $(N/2)*V_0$, and the pulse duration is determined by the Coiled Transmission Line length and dielectric constant. Resistive or capacitive elements may be installed to grade static or transient pulses across series connected switches, or to insure current sharing in parallel switches.

There are also numerous ways of enhancing the shape of the output pulse delivered to dynamic, non-linear loads such as magnetrons. If desirable, the output voltage pulse can be ramped up to compensate for a collapsing impedance load by adding various pulse shaping components at the output (high voltage), input (ground side), or distributed within the circuit. In one version, such a circuit could be designed to add odd harmonics of the desired fundamental frequency. The switches (if any) associated with the pulse compensation circuit may be fired earlier or later than the remaining Marx stage switches. If additional switches are installed in series with the inductors, the firing time of these switches may be optimized to obtain the desired pulse shape at the load. The voltage pulse can thereby be tailored to be flat, or to ramp up (or down) with a specific slope. The risetime of the pulse is still dominated by the erected Marx inductance of the Marx divided by the load resistance; but the pulse fall time can be adjusted by switch timing; selection of component (capacitors, inductors, and resistors) values; and charge voltage on the low end Marx capacitors.

One possible fabrication processes, commensurate with the embodiment of the present invention, can be visualized by referencing FIGS. 9 to 13. At a minimum, the fabrication process consists of: 1) the selection of materials and preparation of the liquid dielectric media; 2) machining and preparation of the electrodes and inner electrode clamps; pouring, injecting, etc. the liquid dielectric media into the electrodes; partially or fully curing the dielectric media; providing electric field stress relief at the inner conductor exits and outer conductor boundary (joint); and providing mechanical support for the completed Coiled Transmission Lines.

Figure 9:
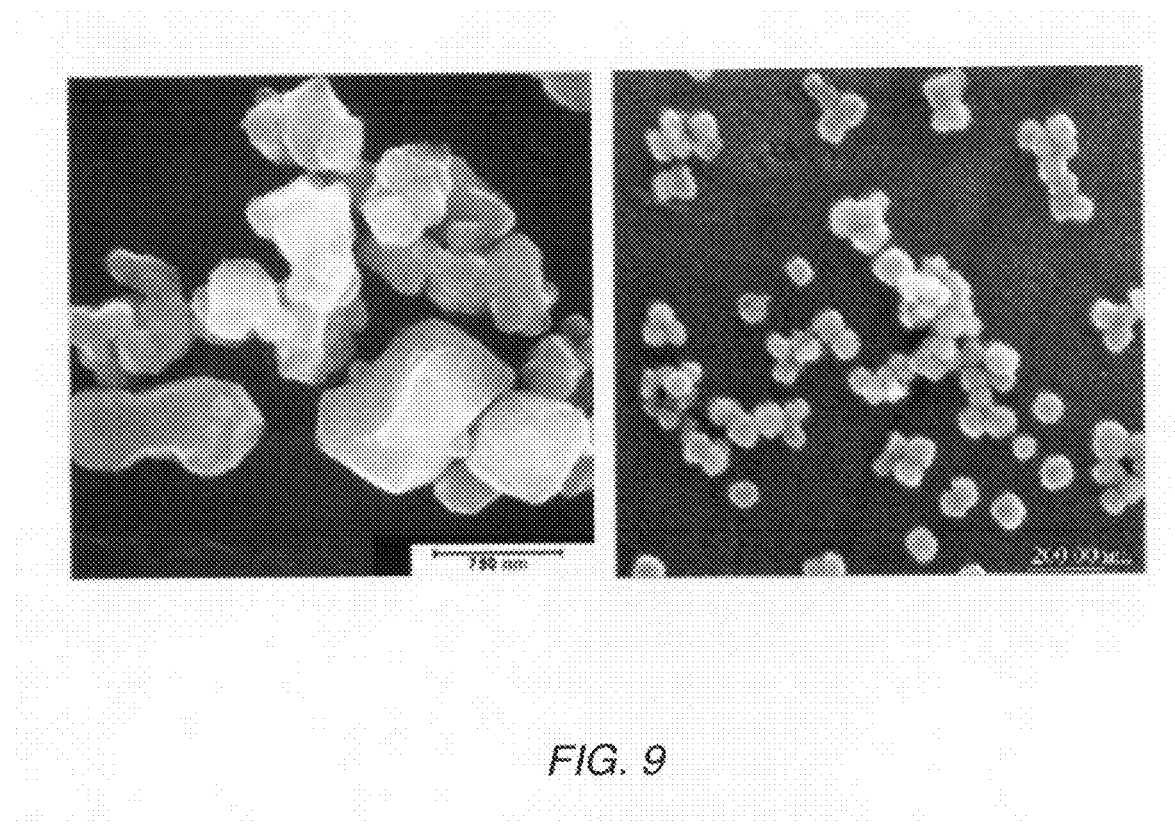
FIG. 9 is a comparison of conventional milled barium titanate with those fabricated into nano-sized particles—note difference in magnification.

FIG. 9 is a comparison of conventional milled barium titanate particles with those fabricated into nano-sized particles; demonstrating the advantage of smaller particle sizes. While many sizes and shapes of dielectric particles may be acceptable, smaller particle sizes with smooth, uniform shapes (preferably round) are advantageous from the standpoint of a uniform, closely packed, homogeneous media that does not have sharp edges or other field enhancement sites.

Figure 10:
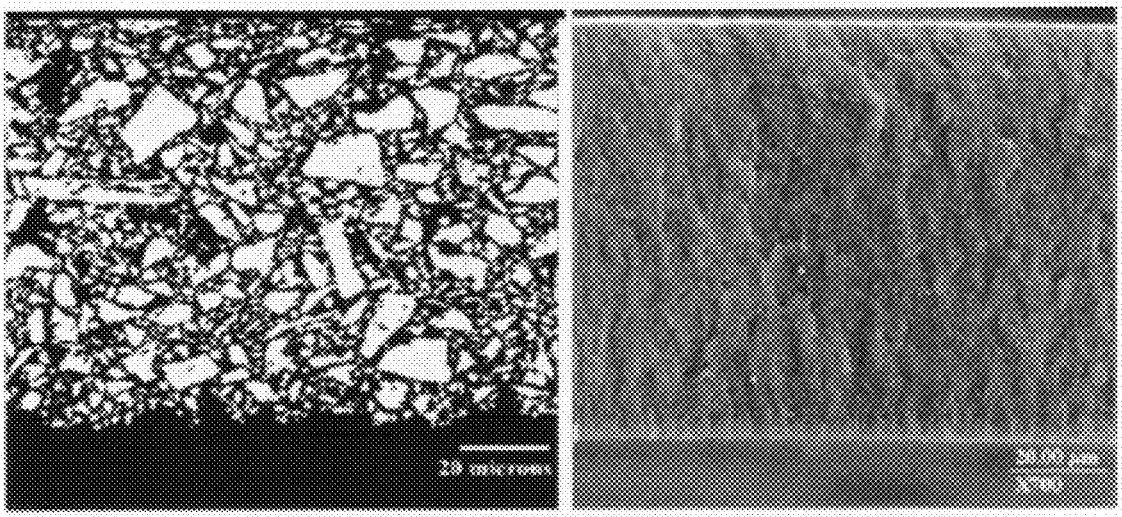
FIG. 10 is a pair of photographs comparing a conventional milled barium titanate sintered capacitor to of a cured nano-ceramic/polymer composite—note difference in magnification.

FIG. 10 is a photograph of a representative thermally cured nano-ceramic/polymer composite compared to a conventional barium titanate ceramic capacitor; which demonstrates that the nano-sized particles produce improvements in the electric field strength of the cured media because of the reduction in sharp edges or other field enhancement sites. Moreover, the high dielectric constant particles have an improved packing factor when produced as nano-particles, thus enabling a higher overall media dielectric constant.

Figure 11:
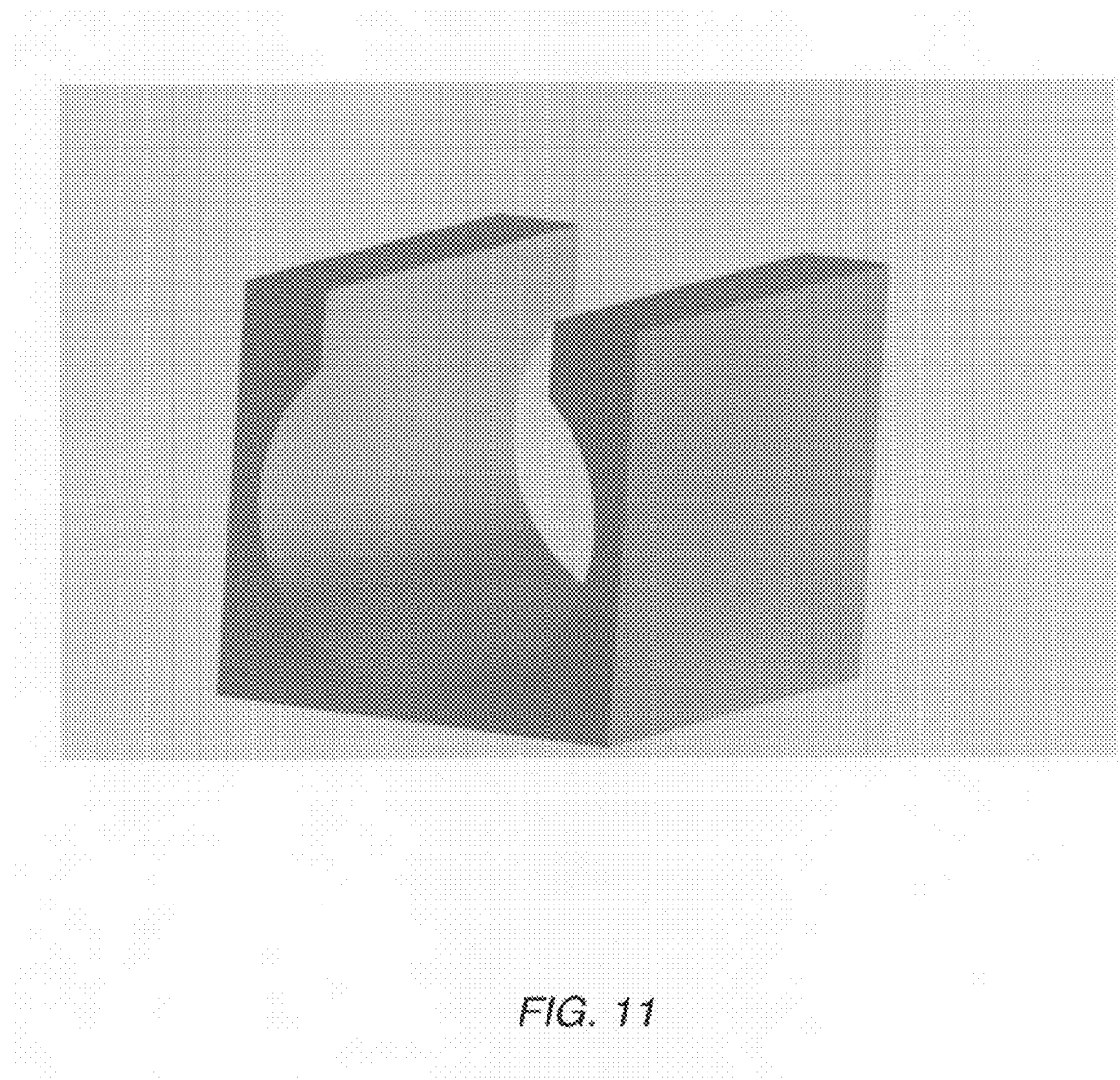
FIG. 11 depicts a "lollipop" cut into the bottom half of the outer conductor as the first step in the fabrication process.
Figure 12:
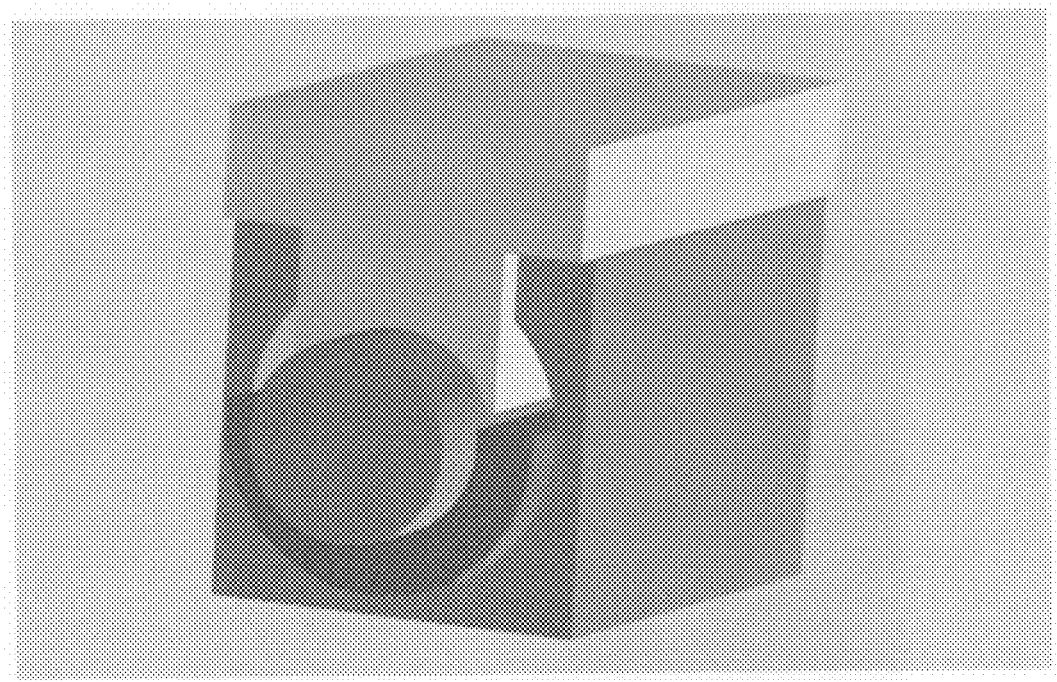
FIG. 12 depicts the center conductor (held by a clamp) and the first layer of nano-ceramic polymer poured into the outer conductor as the second and third steps in the fabrication process.
Figure 13:
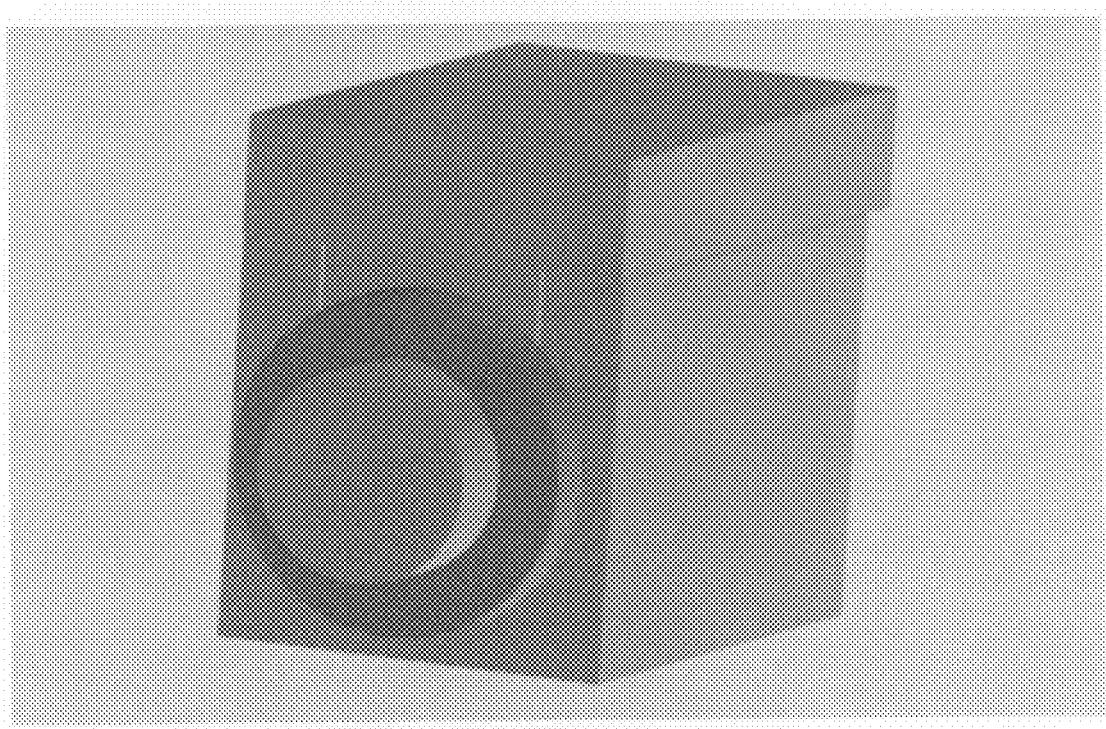
FIG. 13 depicts the top half of the outer conductor installed and the final layer of nano-ceramic polymer poured and cured as the fourth and fifth steps in the fabrication process.

One method of conductor machining and liquid dielectric media casting process is demonstrated by FIGS. 11 through 13. FIG. 11 depicts the first step in the fabrication process, which is a "lollipop" shaped cut into the bottom half of the outer conductor. Only a portion of the outer conductor is shown, and it could be configured as either linear (as depicted), or in either radial or axial spirals/coils. FIG. 12 depicts the second and third steps in the fabrication process: the center conductor is held in place by center conductor clamps and the first layer of nano-ceramic polymer is poured into the bottom portion of the outer conductor and partially cured. The fourth and fifth steps in the fabrication process are shown in FIG. 13, which depicts the installation of the top portion of the outer conductor; and the pouring or injecting of the final layer of nano-ceramic polymer, which is then cured to form the final coaxial transmission line. The top portion of the outer conductor would be indexed to the bottom portion via one or more methods, such as index hole/pin sets, vertical/horizontal steps, etc. The inner conductor could be held in the clamps via one or more mechanisms such as a weak glue, vacuum, or elastic "snaps" made in the plastic clamp that extend slightly beyond 180 degrees.

An alternative fabrication method would be to install a surrogate top outer conductor made out of a plastic such as Teflon (or by applying mold release to a metal mold) and then fill the entire coaxial configuration with a liquid dielectric such as a nano-crystalline ceramic dielectric and thermal set polymer formulation in one or more stages. After curing, the Teflon mold would be removed and the top surface of the solid dielectric media would be coated with a conductive layer via a process such as electro-plating or flame spraying. Finally, a conductive top outer electrode cap would be installed to complete the coaxial assembly.

Alternatively, both top and bottom non-stick surrogate electrodes could be used to alleviate cure induced mechanical stresses in the polymer matrix. The final metal electrodes could be installed after a metallic coating is added to the CTL after removal of the mold.

Additionally, the inner electrode could be constructed with tubular braided wire encircling an elastic core, such as the outer braid from a co-axial cable installed over silicone or a soft, flexible O-Ring material. This feature enables significant cure induced mechanical stresses to be eliminated or substantially reduced, thus minimizing the probability of thermal or shrink induced stress fractures in the cured solid dielectric.

Another alternative fabrication method would be to preform and clamp the inner electrode into the completed outer electrode and to cast the entire system in one step.

Another alternative fabrication method would consist of the fabrication of the outer electrode in two halves with hemispherical cuts rather than the previously described "lollipop" shaped cuts in the outer conductor. One or more pour and cure cycles could be employed.

Figure 14:
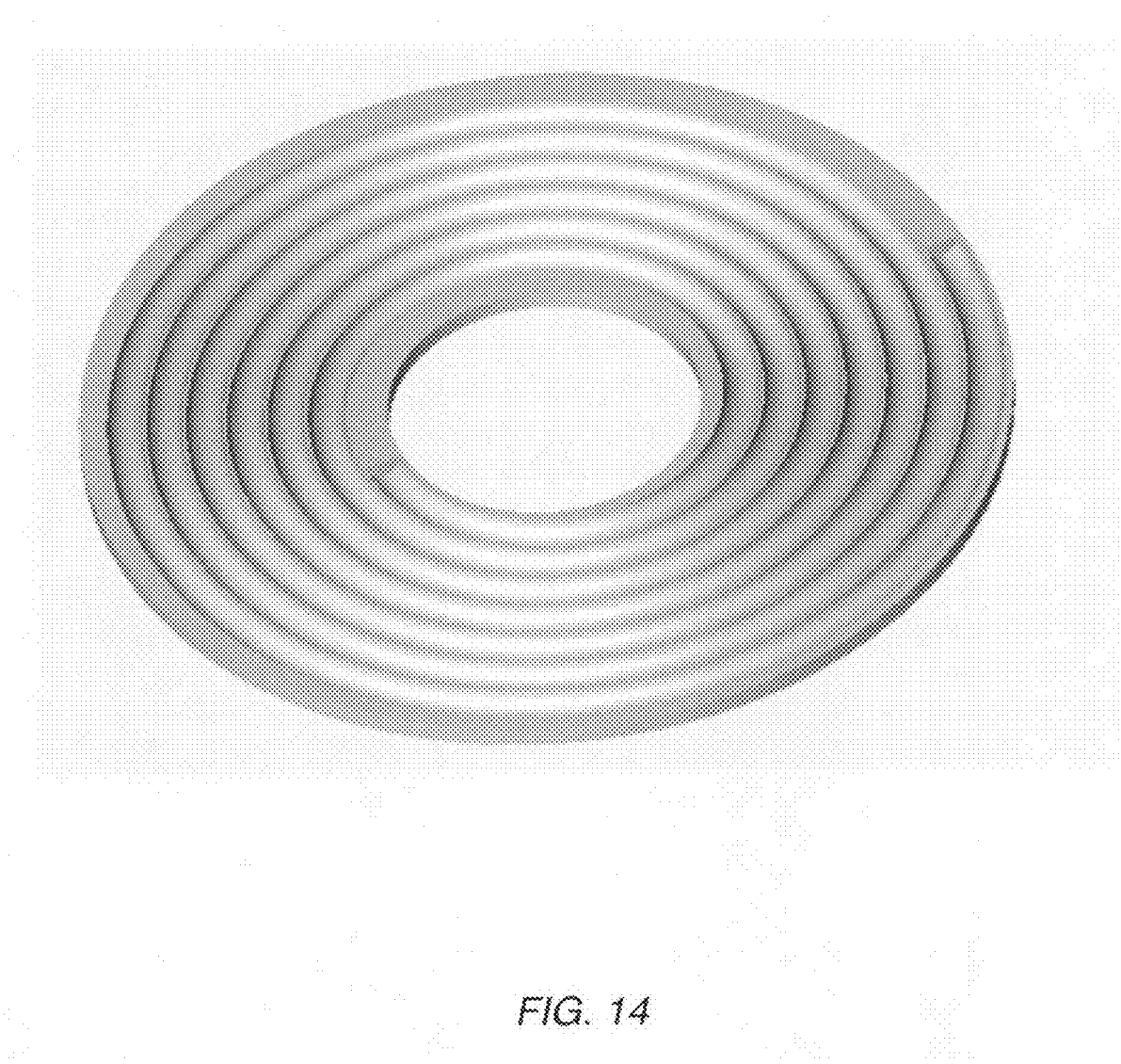
FIG. 14 depicts a spiral hemispherical shaped cut into the outer conductor base plate as the first step in the fabrication process for a radial spiral Coiled Transmission Line.
Figure 15:
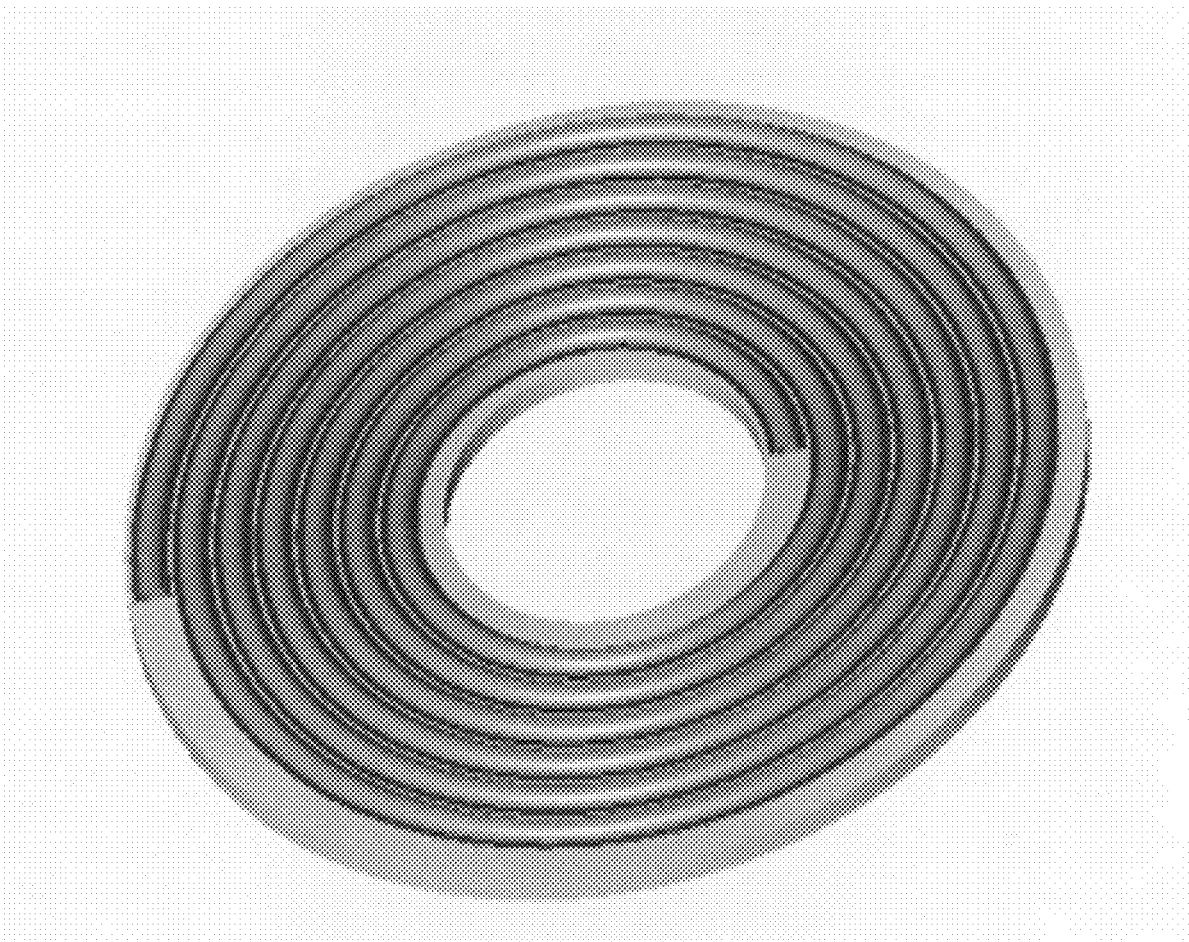
FIG. 15 depicts the center conductor and the first layer of nano-ceramic polymer poured into the outer conductor as the second and third steps in the fabrication process for a radial spiral coiled transmission line.

The above processes apply to both linear and coiled configurations. FIG. 14 depicts the first step in the fabrication process for a radial spiral coiled transmission line pulse generator: cut (or mold) a spiral hemispherical cross sectional into the outer conductor base plate. The second and third steps in the fabrication process for a radial spiral coiled transmission line are demonstrated in FIG. 15: the center conductor is held in place by a set of top clamps (not shown) and the first layer of nano-ceramic polymer is poured into the bottom half of the outer conductor and partially cured. Finally, the clamps are removed, the top half of outer conductor is installed, and the remainder of the nano-crystalline ceramic/polymer formulation is injected into the coaxial configuration and cured to complete the assembly. The inner conductor could be precisely preformed and positioned to the outer conductor plate with external clamps, thus permitting a single dielectric cast and cure process, rather than the two step process previously described herein. The inner conductor could also be preformed by installing it into a mold and thermally annealing it to maintain its precise coiled shape. The Coiled Transmission Lines could take the geometric form of either a radial spiral, or an axial spool (such as a wench or a level wind fishing reel) depending on the best form factor match for the application.

Figure 16:
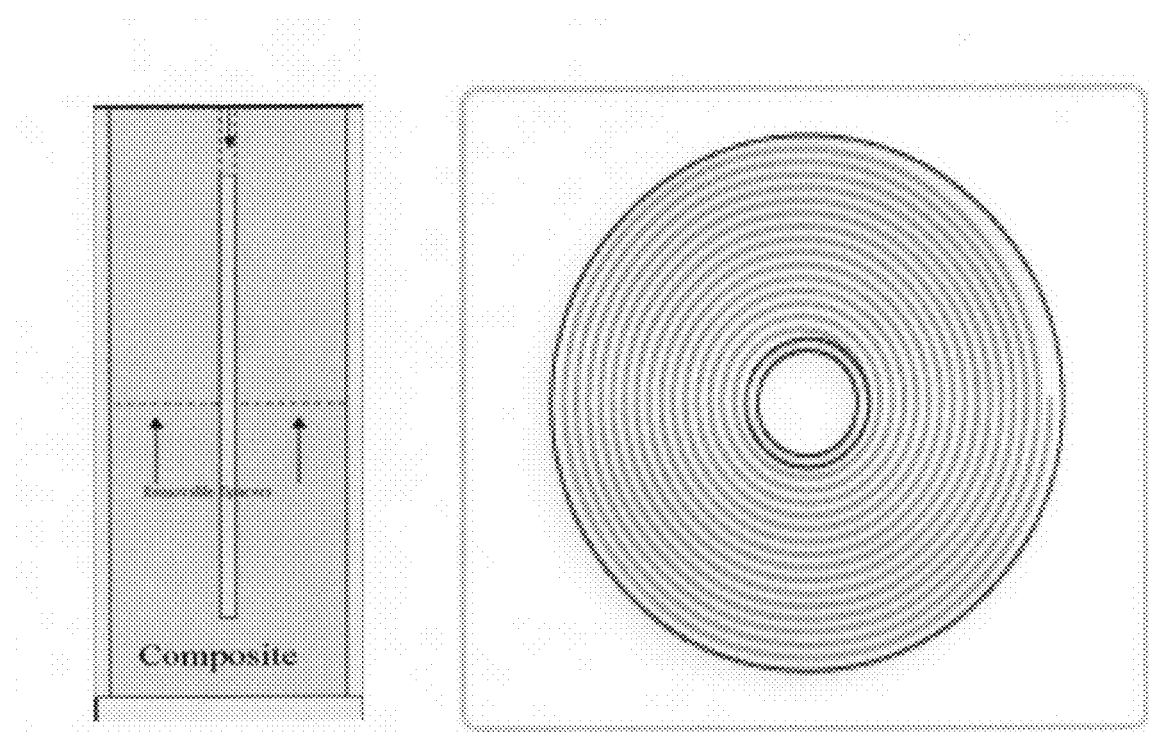
FIG. 16 depicts one turn of a tri-plate transmission line configured as a radial coil.

FIG. 16 depicts an alternate geometric form: a tri-plate transmission line configured as a radial coil, where a high voltage is applied to the inner conductor plate, thereby creating two parallel plate transmission lines electrically connected in parallel. The net impedance is, therefore, one half of the impedance of each individual parallel plate transmission line. This geometry suffers from an intrinsic enhanced electric field at the edges of the inner conductor.

Figure 17:
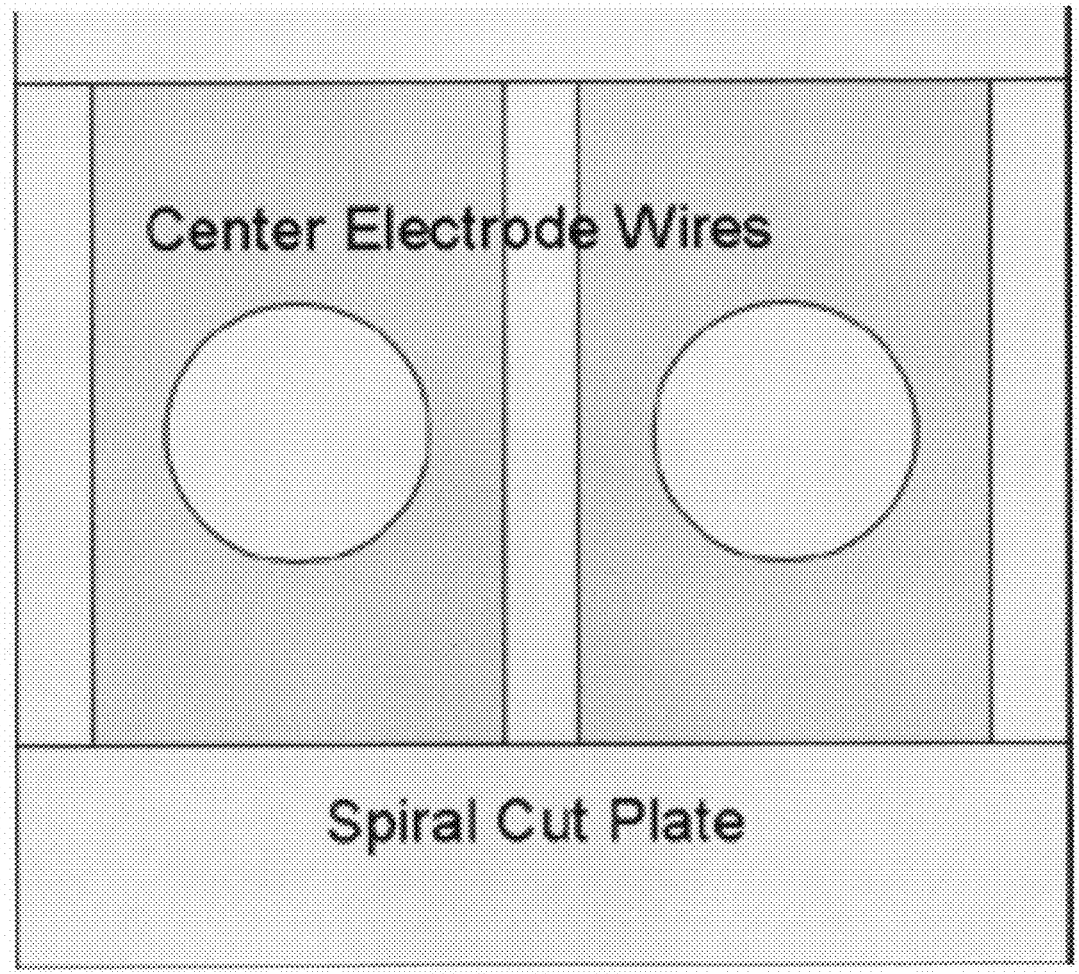
FIG. 17 depicts two turns of a "circle in box" configuration transmission line configured as a radial coil.

FIG. 17 depicts another alternate geometric form: a "Circle in Box" transmission line configured as a radial coil; whereas the center conductor has a circular cross-section, but the outer conductor walls are cut with a straight end-mill to somewhat simplify the fabrication process. The impedance of this configuration is higher then that of a comparably sized true coaxial topology.

All variations of the parallel plate, tri-plate, or circle in box geometries may benefit from incorporating an electrical conductor across the entirety of one surface of the transmission line to prevent the magnetic field from any segment of the transmission line from escaping and possibly coupling into other segments of the line, thereby causing a transformer type action that could potentially spoil the pulse fidelity. Covering both surfaces of the coiled transmission line pulse generator with electrical conductors may prove to be desirable.

Numerous other manufacturing and process steps are feasible and the examples provided above do not limit the scope of this invention. While dielectric nano-particles have been used in the prototypes, there is a wide range of dielectric powers/particles available for this purpose and this patent does not limit the dielectric particle size, shape, uniformity, material, coating, dielectric constant, size distribution (range), or other characteristics. Moreover, while a thermoset two part epoxy has been successfully used to fabricate the prototype solid dielectric transmission lines, numerous monomers, polymers, oligomers, and/or cross-linkers are suitable for this purpose and the patent is not limited to those currently in use. Additionally, the materials preparation, degassing, and pour and cure cycles can be modified to include innumerable processes such as the application of pressure without violating the intent of this patent. For example, the direct formation of solid dielectric coiled transmission lines by a sintering process similar to that used to manufacture ceramic capacitors satisfies the intent of this disclosure.

Examples of possible embodiments of this invention are included as follows:

Example 1

Figure 18:
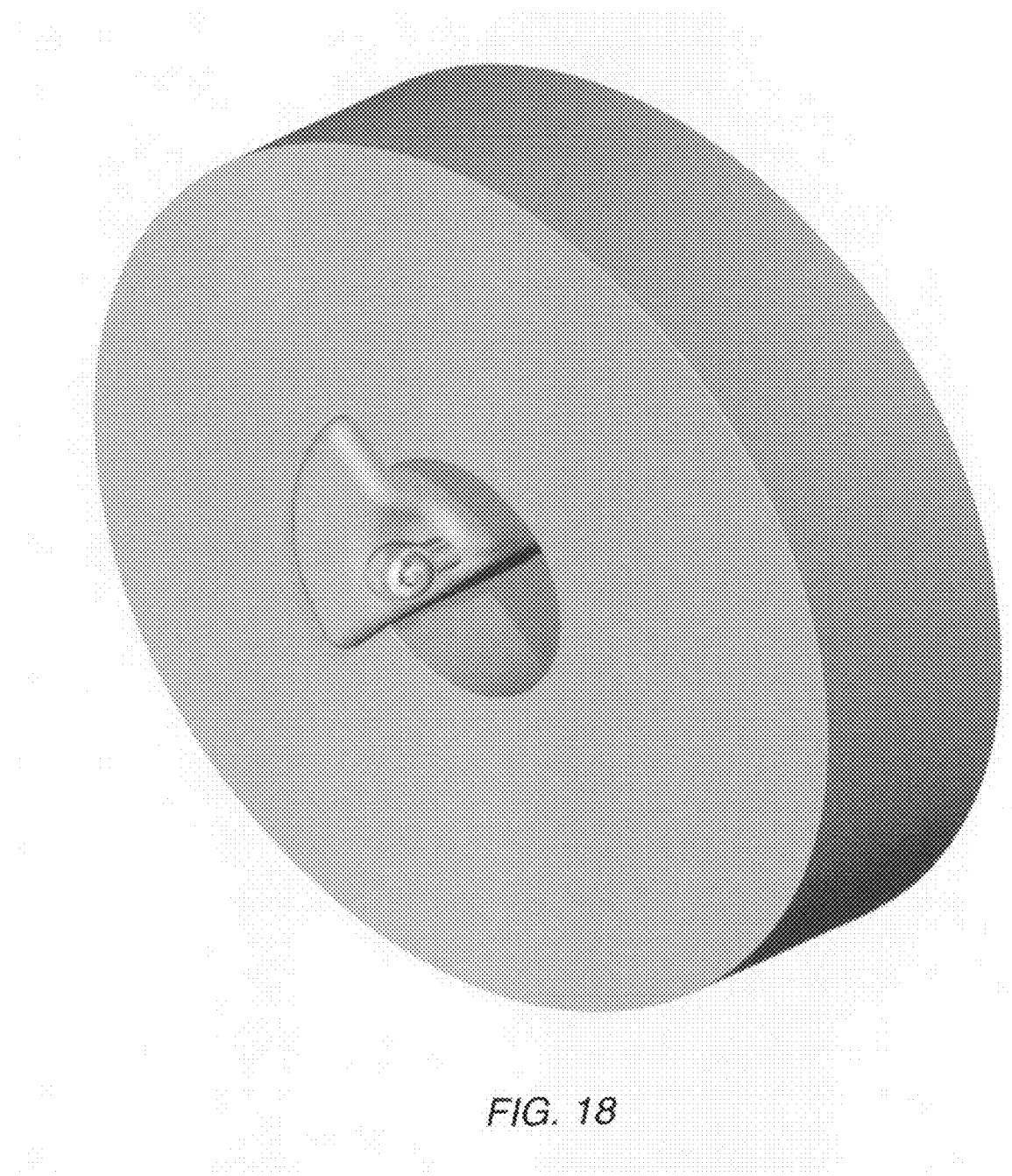
FIG. 18 depicts a Tri-Plate CTL with integrated high voltage spark gap electrode and shaft.
Figure 19:
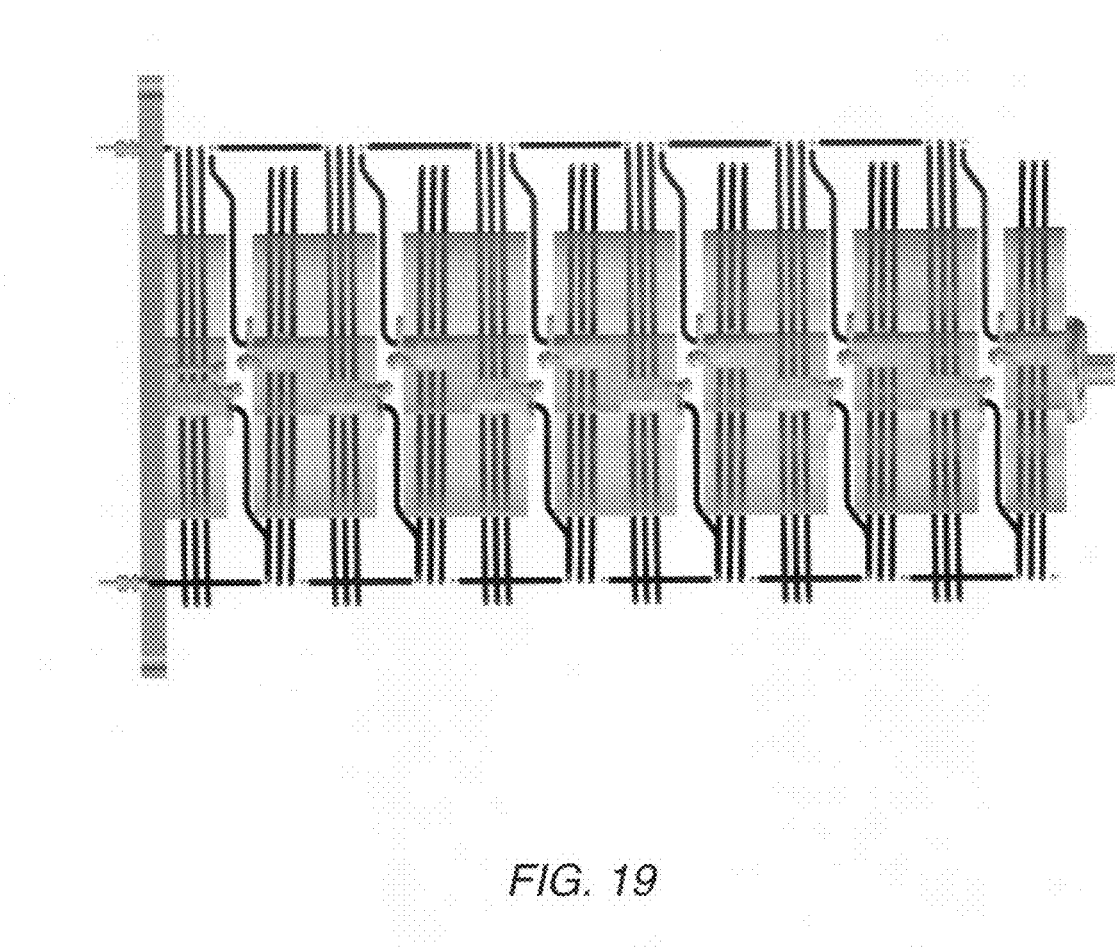
FIG. 19 depicts a side view of a bi-polar, twelve-stage, radial Tri-Plate Marxed Coiled Transmission Line pulse generator configuration. While the charge/isolation inductors and output bushing are shown, the charging supply and load are not shown.
Figure 20:
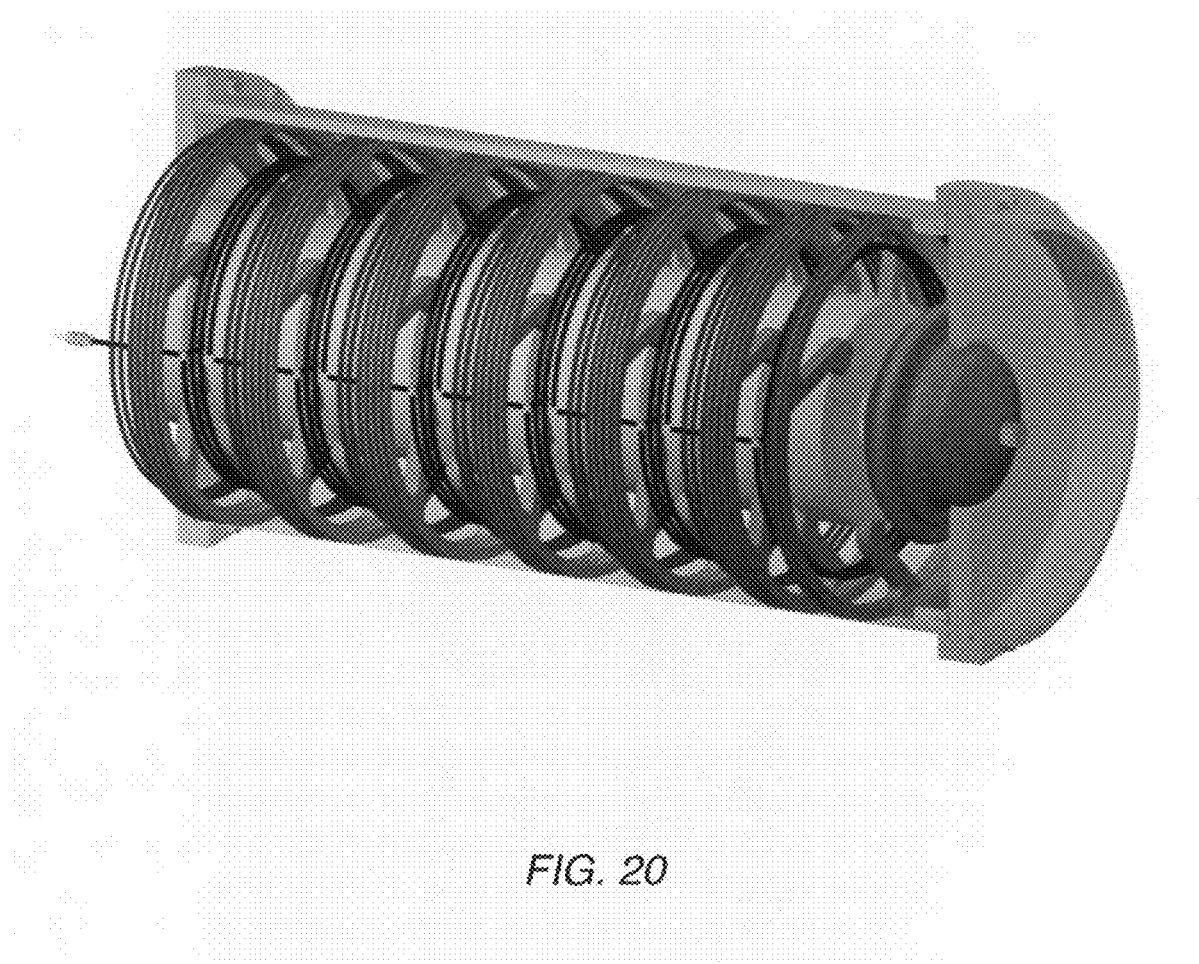
FIG. 20 is a concept of the system shown in FIG. 19 installed into a high pressure vessel, which serves to contain the gas that provides high voltage insulation to the vessel wall and between components. This gas may also serve as the spark gap media, unless a separate spark gap column or individual spark gap enclosures are incorporated into the design.

Many High Power Microwave devices, such as Magnetically Insulated Line Oscillators (MILO's), Relativistic Magnetrons, Ubitrons, traveling wave tubes, etc., require relatively flat-topped pulses. These devices range in impedance from approximately eight to one hundred Ohms and require pulse durations ranging from about one hundred nanoseconds to more than one microsecond. The waveforms can be generated by connecting sets of Coiled Transmission Lines into a Marx generator configuration. Such a circuit; designed to drive a 500 kV, 200 ns flat-topped pulse into a forty Ohm relativistic magnetron; could consist of eleven Marxed CTL's charged to at least 91 kV. Numerous other extensions of the basic circuit concept are feasible. FIG. 18 demonstrates a single radially coiled 200 ns tri-plate coiled transmission line pulse generator equipped with a spark gap switch; whereas FIG. 19 illustrates the side view of a bi-polar, twelve stage, Tri-Plate Marxed coiled transmission line pulse generator complete with the charging inductors and spark gaps. FIG. 20 depicts this system installed into a metallic pressure vessel that contains a high-pressure gas to insulate the system and provide a low-inductance return current path.

Example

The accelerating cavities for linear accelerators are typically powered by radio frequency electromagnetic pulses that are produced by klystrons. This invention can satisfy the requirements of such klystrons: for example, a Photon Initiated Marxed-CTL pulse generator can produce low ripple 500 kV, 530 A, 1.6 microsecond flattop pulses with rise and fall times of less than 100 nanoseconds at repetition rates of at least 120 Hz by Marxing thirty, 31 Ohm, 34 kV CTL's with solid state switches such as photon initiated thyristors. Two, series connected, 17 kV photon initiated thyristors would serve as the 34 kV Marx stage switches.

Example 3

Low impedance pulsers that produce high voltages and currents with flat-topped pulses can be very useful to calibrate voltage or current probes. A single linear or Coiled Transmission Line could produce a 50 kV pulse with currents as high as 50 kA for a one Ohm system. The voltage can be increased by configuring more than one solid dielectric Transmission Line into Marx or Blumlein circuit topologies. Several parallel, higher impedance devices could be used rather than a single low impedance device.

The preceding examples can be repeated with similar success by substituting the generically or specifically described elements and/or operating conditions of this invention for those used in the preceding examples. Numerous other applications and examples are available.

Experimental Results

Figure 21:
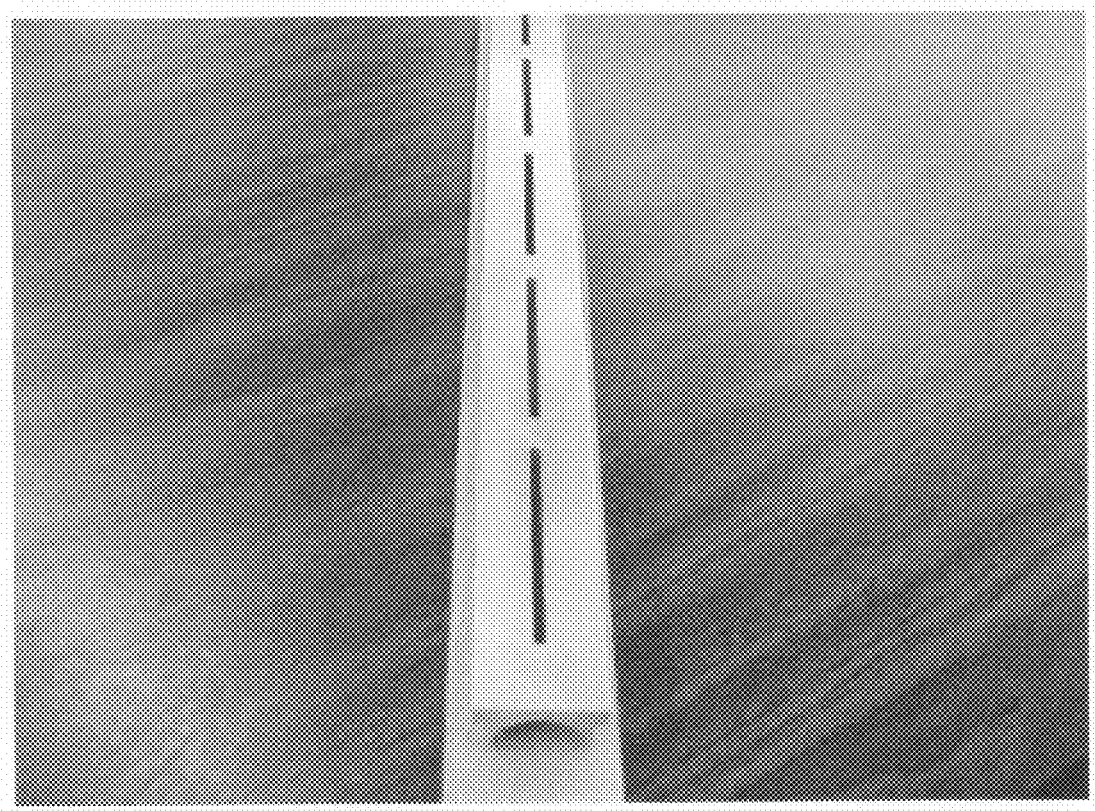
FIG. 21 is a photograph of the top half of the outer conductor for a linear prototype co-axial transmission line.
Figure 22:
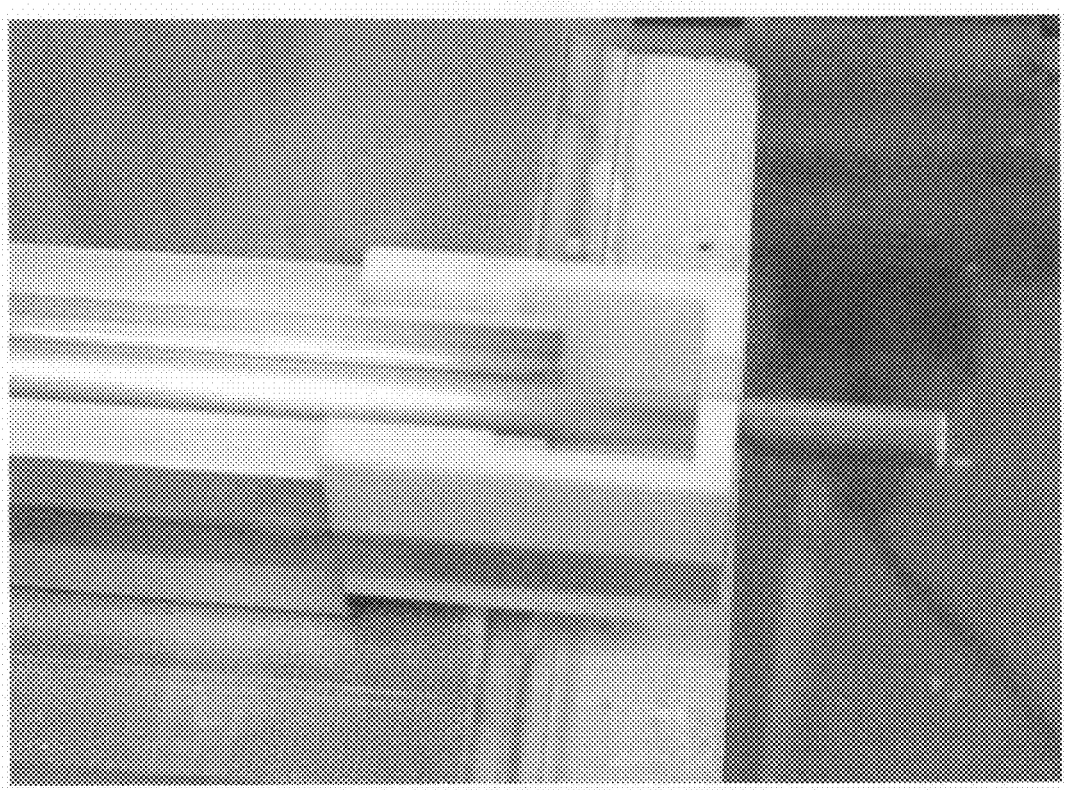
FIG. 22 is a photograph of the end damns on the outer conductor for a co-axial linear prototype.
Figure 23:
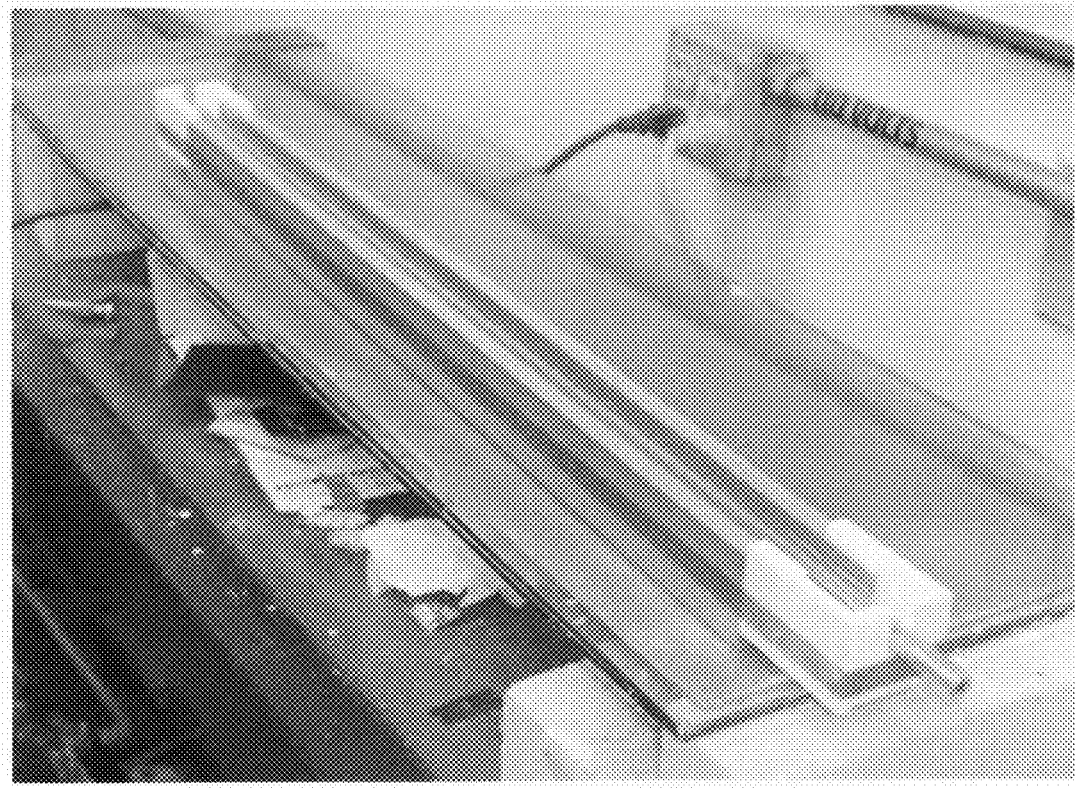
FIG. 23 is a photograph of the bottom half of the outer conductor for a co-axial linear prototype.

Co-Axial Configuration:
FIG. 21, FIG. 22, and FIG. 23 are photographs of the linear co-axial coiled transmission line prototype taken before and during the fabrication process. The slots in the top half of the outer conductor are included in order to provide a reservoir of nano-ceramic media to re-supply the coaxial region to compensate for possible shrinkage during the cure cycle. End reservoirs are included for the same reason; and they also provide insulation at the terminations to prevent flashover.

Figure 24:
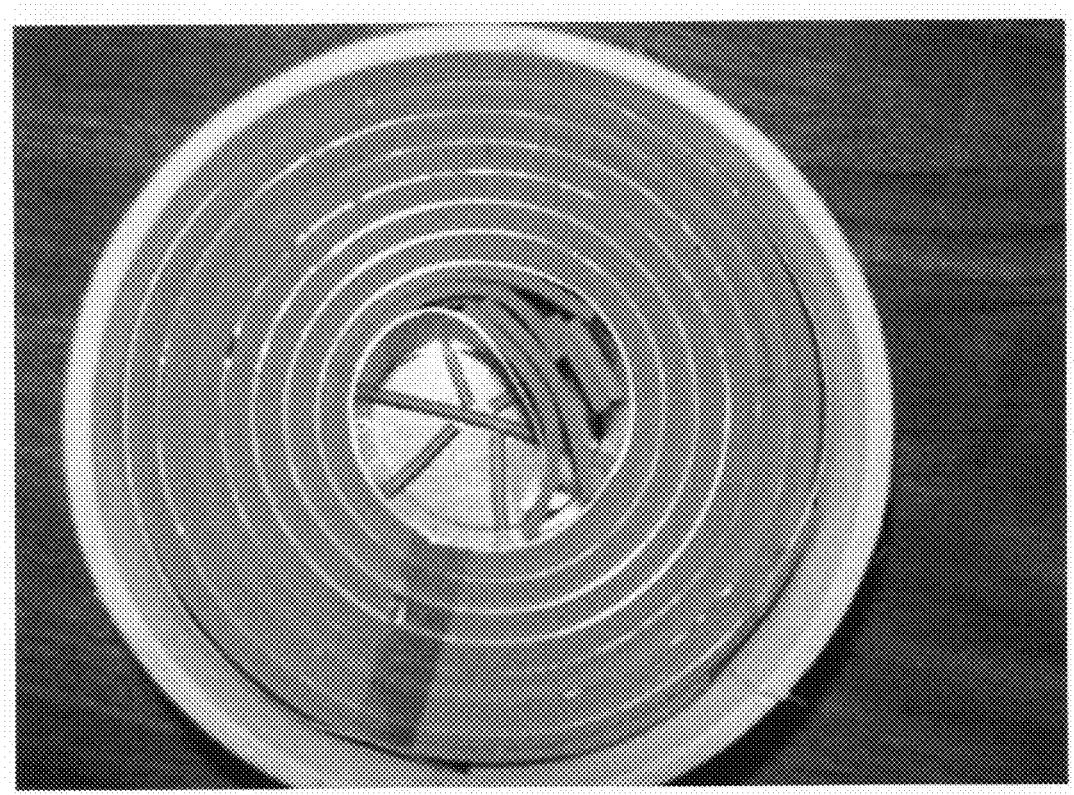
FIG. 24 is a photograph of a prototype tri-plate coiled transmission line taken during the fabrication process, where the silicone spacers that hold the transmission line conductors in place can be seen at the bottom of the device.
Figure 25:
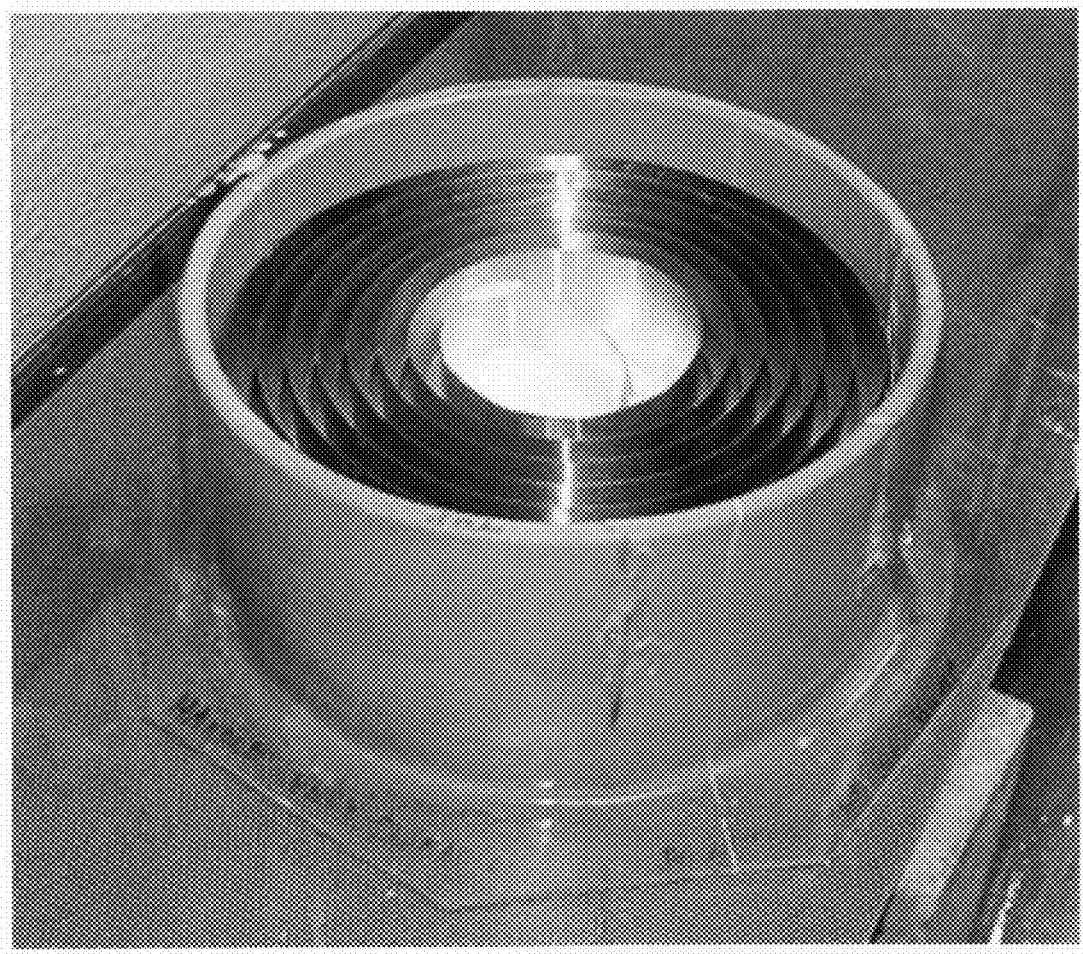
FIG. 25 is a photograph of a prototype tri-plate coiled transmission line taken during the fabrication process, where the silicone spacers have been removed following the pour and cure of the first layer of epoxy in preparation for the final layer.
Figure 26:
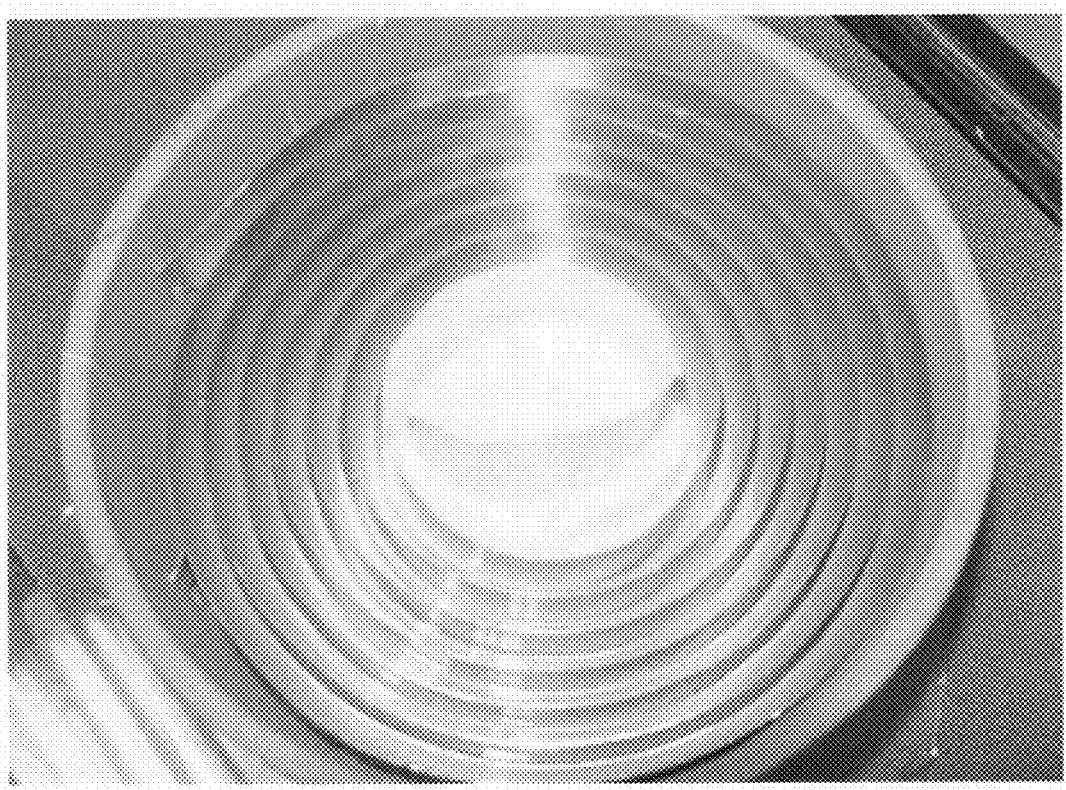
FIG. 26 is a photograph showing another view of the prototype tri-plate coiled transmission line during the fabrication process—just prior to pouring the second layer of epoxy.

Tri-Plate Configuration:
Two tri-plate prototypes coiled transmission line pulse generators were fabricated to produce flattop pulse durations of ~50 ns. The fabrication process is demonstrated by the photographs shown in FIG. 24, FIG. 25, FIG. 26, and FIG. 27. FIG. 24 shows the silicone strip "spacers" that maintain the desired separation between the tri-plate conductors "striplines". The inner conductor width was 1.5 inches, the outer conductor width was 2.5 inches, and the spacing between the electrodes was 0.156 inches. The silicone spacers occupy the top half of the CTL and the first layer of epoxy is poured on top of the silicone spacers and partially cured to form a rigid structure. The silicone is then removed, the device is turned-over, and the top layer of epoxy is poured and cured, as shown by the photographs displayed in FIG. 25, and FIG. 26. The white epoxy can be seen in the center of the device in FIGS. 25 and 26. The epoxy is vacuum degassed and, the pour is made in a vacuum over to prevent bubble formation in the cured solid dielectric media. The controlled thermal-set epoxy is thermally cured by controlling the time and temperature of the cycle. The first epoxy layer was not fully cured until the second layer was poured. This may have helped to insure a good bond at the interface of the two layers. A surfactant and a low vapor pressure thinner, such as Hexanes, was added to the epoxy and Barium titanate nano-particle slurry, which was then mixed via a high power ultrasonic process to achieve a uniform, homogeneous, nano-particle/epoxy mixture with a high concentration of high dielectric constant nano-particles. The low vapor pressure thinner was then removed under a low, controlled vacuum at slightly elevated temperatures and the mixture was cured during several stages of precisely controlled vacuum, temperature, and time conditions. A positive displacement pump, operated under vacuum transfers the mixture from the vacuum mixing chamber to the mold, which is pre-heated in the vacuum curing oven. In some cases, mold release was applied to the mold prior to curing the epoxy/nano-particle mixture to enable easy removal from the mold. In other cases, the mold was made of silicone, which has intrinsic release capabilities.

Figure 27:
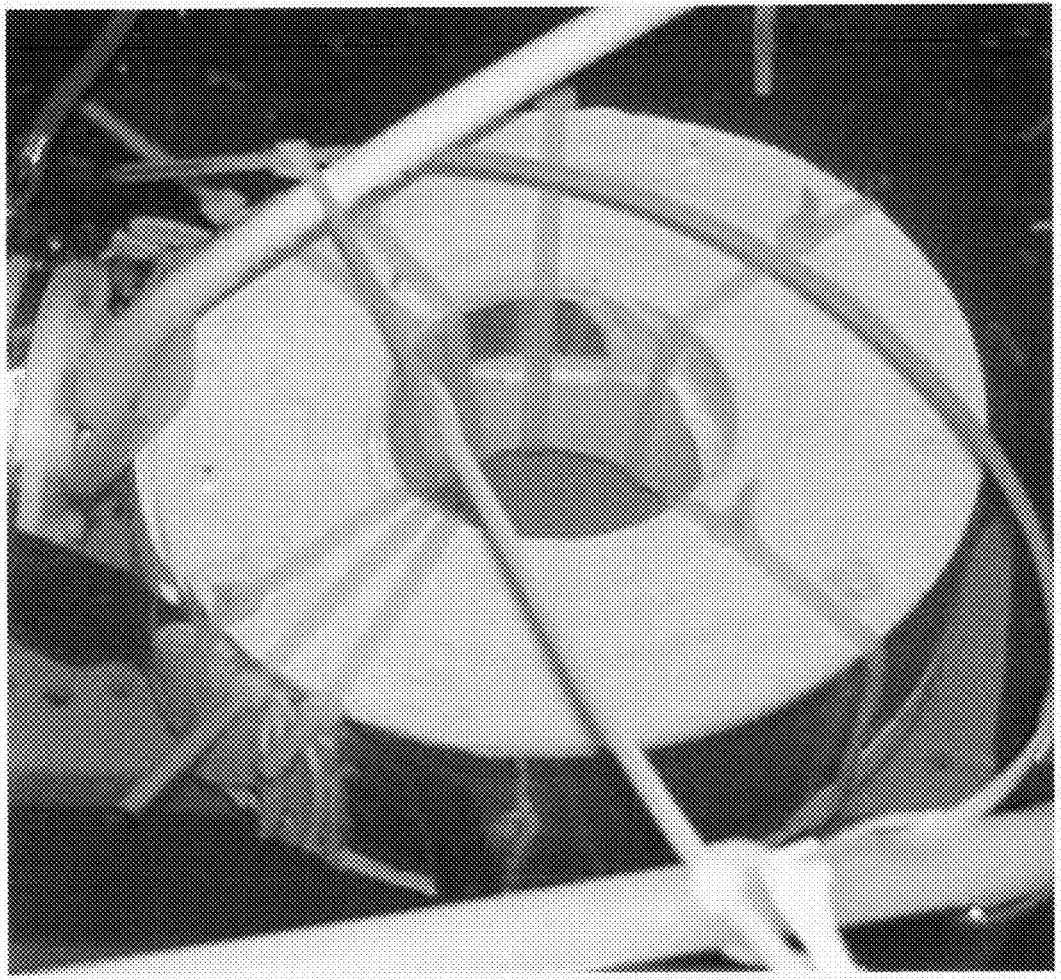
FIG. 27 is a photograph of the second completed prototype three-Ohm tri-plate coiled transmission line pulse generator.
Figure 28:
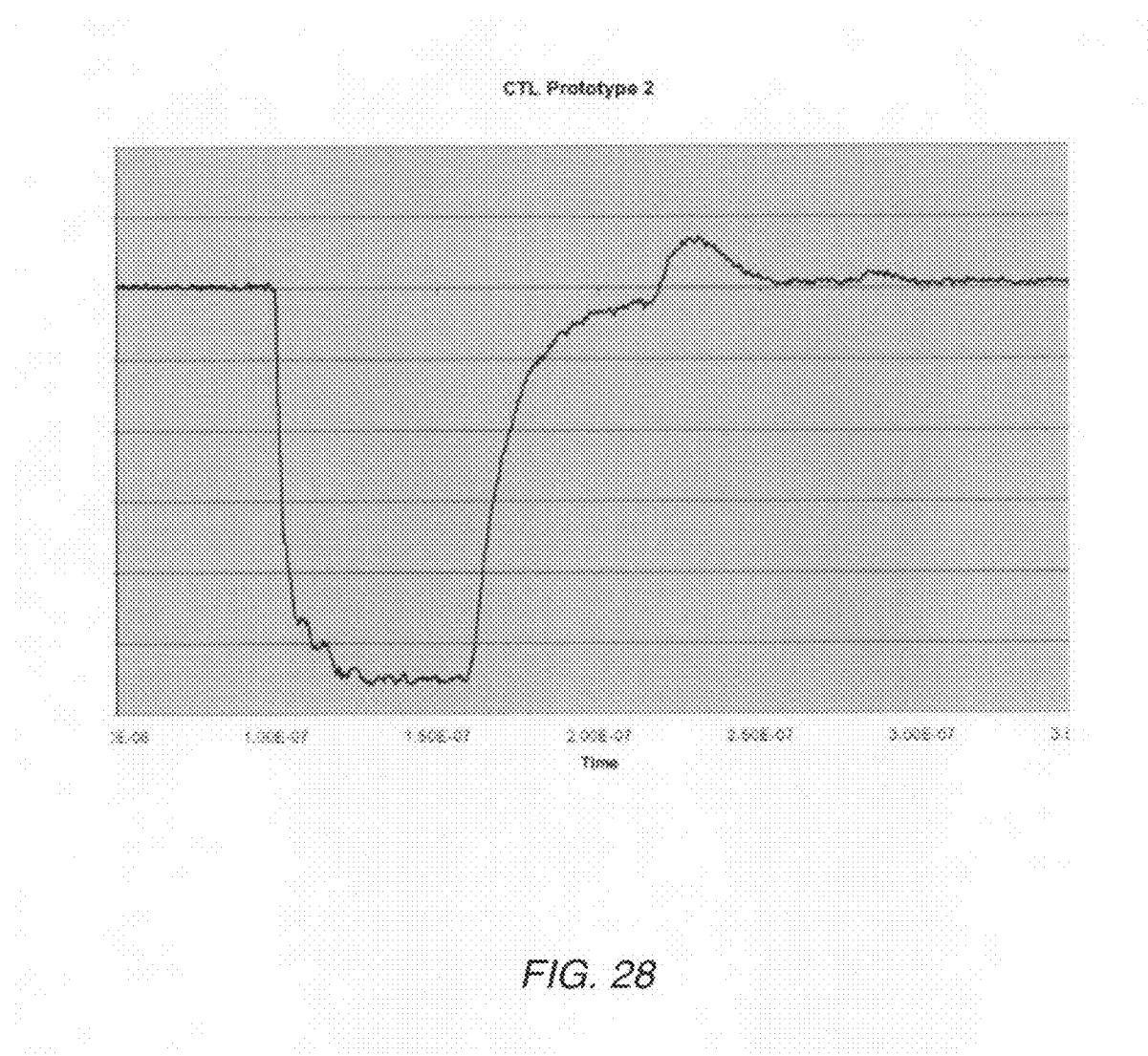
FIG. 28 shows the load voltage waveform from the 3Ω, 65 ns tri-plate prototype coiled transmission line charged to ~50 kV.

The second completed Tri-Plate prototype coiled transmission line pulse generator is shown by the photograph in FIG. 27. This prototype was successfully operated at voltages of ~90 kV, thereby demonstrating that an output voltage of ~48 kV could be obtained into a slightly positive mismatched load resistor. The 10-90% risetime is ~10-15 ns, and the flat-top is ~50 ns. This data compared favorably with the results from a Spice model. FIG. 28 illustrates the data taken from a 50 kV charge test. The load voltage is ~27.5 kV into a slightly positive mismatched load.

Following the successful 90 kV single shot tests, the CTL was operated up to 60 kV at repetition rates of approximately ten pulses per second for short bursts.

When these coiled transmission line pulse generators are stacked and series switched in a Marx generator configuration; the integrated assembly becomes a hollow cylinder; whereby the switch stack is routed up the holes in the centers of the Coiled Transmission Lines, as demonstrated in FIGS. 3-5 and 18-20.

CONCLUSION

The features of this invention allow construction and operation of a variety of high voltage, high repetition rate pulse generators comprised of compact, solid dielectric Coiled (or linear) Transmission Lines; which intrinsically form flat-topped, rectangular voltage pulses when charged and switched into a matched impedance load. Voltage levels may be increased by Marx and/or Blumlein principles incorporating spark gap or, preferentially, solid state switches (such as optically triggered thyristors) which produce reliable, high repetition rate operation. Moreover, these Marxed pulse generators can be DC charged and do not require additional pulse forming circuitry, pulse forming lines, transformers, or a high voltage spark gap output switch. The apparatus accommodates a wide range of voltages, impedances, pulse durations, pulse repetition rates, and duty cycles.

Although the invention has been described with reference to particular embodiments, other embodiments can achieve the same results without departing from the scope of the invention. Variations and modifications of the present invention will be obvious to those skilled in the art and it is intended to cover in the appended claims all such modifications and equivalents. For example, the formation of a coiled transmission line by a sintering process would still satisfy the intent of this patent disclosure. The entire disclosures of all references, applications, patents, and publications cited above are hereby incorporated by reference.

What is claimed is:

1. A high voltage pulse generator comprised of:
   a plurality of discrete energy storage and discharge pulse shaping transmission lines comprised of;
      a plurality of electrical conductors that are charged positive, and/or negative, and/or neutral; and
      a solid, or flexible plastic, high dielectric constant media separating the electrical conductors;
   a high voltage charging source comprised of a plurality of power supplies and charge/isolation elements;
   a plurality of switches to discharge the plurality of charged transmission lines into the load;
   a plurality of fault protection elements;
   a plurality of voltage and current diagnostic elements;
   a vessel to contain the pulse generator; and
   mechanical apparatus to support the pulse generator.

2. The pulse generator of claim 1, wherein the transmission line dielectric media is comprised of high dielectric constant powder and liquid monomer, polymer, oligomer, and/or cross-linker blends that fill all or part of the volume between the electrical conductors and are cured in one or more layers to form a solid, or flexible plastic media with a relative dielectric constant greater than ten.

3. The pulse generator of claim 2, wherein the cure rate of the high dielectric constant transmission line media is thermally controlled.

4. The pulse generator of claim 1, wherein the transmission line electrical conductors are constructed in various shapes and geometries, including, but not limited to: thin, wide strips configured as continuous parallel or tri-plate conductors.

5. The pulse generator of claim 1, wherein the transmission line electrical conductors are constructed in various shapes and geometries, including, but not limited to: circular cross-section inner conductor and a plurality of planer outer conductors, including two parallel plates or a rectangular cross-section.

6. The pulse generator of claim 1, wherein the transmission line electrical conductors are constructed in various shapes and geometries, including, but not limited to: a co-axial configuration with both inner and outer conductors of circular cross-section.

7. The pulse generator of claim 1, wherein the transmission line co-axial geometric configuration is linear.

8. The pulse generator of claim 1, wherein the transmission line geometric configuration is a radial coil or "spiral".

9. The pulse generator of claim 1, wherein the transmission line geometric configuration is designed to be an axial coil such as the spool of a cable wench, or other coiled geometries such as a helix.

10. The pulse generator of claim 1, wherein the plurality of transmission lines are connected in Marx, Blumlein, or Marxed-Blumlein circuit configurations to increase the output voltage without increasing the charge voltage.

11. The pulse generator of claim 10, wherein the plurality of transmission lines are connected in a Marx or Blumlein configuration by means of a plurality of spark gap switches.

12. The pulse generator of claim 10, wherein the plurality of transmission lines are connected in a Marx or Blumlein configuration by means of a plurality of electrically triggered solid-state switches.

13. The pulse generator of claim 10 wherein the individual transmission lines are connected in a Marx or Blumlein configuration by means of a plurality of optically controlled or optically triggered solid state switches.

14. The pulse generator of claim 10, wherein the plurality of transmission lines are mounted inside a conducting vessel filled with an insulating media such as a gas, oil, or solid potting material; and the high voltage pulse is extracted from the vessel by means of a high voltage bushing.

15. The pulse generator of claim 1, wherein the transmission line inner and/or outer conductors, and/or solid dielectric media are modified to reduce and grade the electric fields near the regions where the inner conductors exit from, and extend beyond the outer conductors to minimize the probability of electrical breakdown or flashover.

16. The pulse generator of claim 1, wherein the transmission line inner electrical conductor is constructed of a tubular braid surrounding a circular elastic core, thus allowing the conductor to move with the dielectric media during the dielectric cure cycle to alleviate thermal and shrinkage induced mechanical stresses.

17. The pulse generator of claim 1, wherein either mold release or a non-stick mold material is used to allow the dielectric media to move within the mold during the cure cycle, thus alleviating thermal and shrinkage induced mechanical stresses.

18. The pulse generator of claim 1, wherein the outer surface of the transmission line solid dielectric media is coated with an electrical conductive media such as electroplate, flame-spray, or conductive paste after removal of the mold.

19. The pulse generator of claim 1, wherein an electrical conductor is installed in contact with the outer surface of the electrically coated solid dielectric media to form the outer conductor of the transmission line pulse generator.

20. The device of claim 10, wherein said charging is accomplished through a plurality of charge/isolation elements comprised of:

Coupled pairs of inductors in the positive and negative charge/isolation legs that are configured to cancel the magnetic fields during the charge cycle to minimize the inductance in series with the power supply, and to add the magnetic fields during the discharge cycle to minimize Marx circuit losses; anel a plurality of diodes in the positive charge/isolation leg and sets of either electrically or optically triggered switches or inductors in the negative charge/isolation leg.

* * * * *